(12) United States Patent
Dow

(10) Patent No.: US 12,172,542 B2
(45) Date of Patent: *Dec. 24, 2024

(54) COMMUNICATION METHOD BETWEEN ELECTRIC VEHICLE, SUPPLY EQUIPMENT AND POWER GRID OPERATION SERVER

(71) Applicant: HYUNDAI MOBIS CO., LTD., Seoul (KR)

(72) Inventor: Young Soo Dow, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 608 days.

This patent is subject to a terminal disclaimer.

(21) Appl. No.: 17/487,370

(22) Filed: Sep. 28, 2021

(65) Prior Publication Data

US 2022/0097551 A1   Mar. 31, 2022

(30) Foreign Application Priority Data

Sep. 28, 2020  (KR) .................. 10-2020-0126298
Sep. 28, 2020  (KR) .................. 10-2020-0126303

(51) Int. Cl.
| | |
|---|---|
| *B60L 53/66* | (2019.01) |
| *B60L 53/68* | (2019.01) |
| *G06Q 50/06* | (2024.01) |
| *H04W 4/44* | (2018.01) |
| *G06Q 50/40* | (2024.01) |

(52) U.S. Cl.
CPC .............. *B60L 53/665* (2019.02); *B60L 53/66* (2019.02); *B60L 53/68* (2019.02); *G06Q 50/06* (2013.01); *H04W 4/44* (2018.02); *G06Q 50/40* (2024.01); *Y04S 30/12* (2013.01); *Y04S 30/14* (2013.01)

(58) Field of Classification Search
CPC ...... B60L 53/665; B60L 53/66; B60L 53/305; B60L 53/64; B60L 58/12; Y02T 90/16; H04W 4/44
See application file for complete search history.

(56) References Cited

U.S. PATENT DOCUMENTS

| | | | | |
|---|---|---|---|---|
| 7,719,232 | B2 * | 5/2010 | Kelty | ............... G06Q 30/0284 320/132 |
| 7,782,021 | B2 * | 8/2010 | Kelty | ............... G06Q 30/0284 320/155 |
| 7,786,704 | B2 * | 8/2010 | Kelty | ................... H02J 7/0071 320/155 |

(Continued)

FOREIGN PATENT DOCUMENTS

| | | | | |
|---|---|---|---|---|
| CN | 107571746 A | | 1/2018 | |
| DE | 102011109422 A1 * | | 2/2013 | ............. B60L 1/003 |

(Continued)

OTHER PUBLICATIONS

KR_101716610_Machine_Translation (Year: 2017).*
JP2020091771_Description_Machine_Translation (Year: 2020).*

*Primary Examiner* — John T Trischler
(74) *Attorney, Agent, or Firm* — NSIP Law

(57) ABSTRACT

According to the present invention, by defining charge process-related messages exchanged between an electric vehicle, a supply equipment, and a power grid, it is possible to establish an efficient billing policy for each charging time, and further it is possible to efficiently operate the power grid. Also, it is possible to provide credit or incentive to a vehicle user and an operator of a supply equipment that participate in CO2 emission regulation.

9 Claims, 8 Drawing Sheets

(56) References Cited

U.S. PATENT DOCUMENTS

| | | | | |
|---|---|---|---|---|
| 8,509,976 | B2* | 8/2013 | Kempton | B60L 53/14 320/109 |
| 8,604,750 | B2* | 12/2013 | Turner | H02J 7/0042 320/109 |
| 8,890,475 | B1* | 11/2014 | Becker | B60L 53/66 320/109 |
| 8,937,456 | B2* | 1/2015 | Bhageria | B60L 53/665 320/109 |
| 8,996,183 | B2* | 3/2015 | Forbes, Jr. | H02J 3/14 700/291 |
| 9,024,571 | B2* | 5/2015 | Uyeki | B60L 58/12 320/101 |
| 9,026,347 | B2* | 5/2015 | Gadh | B60L 53/67 320/132 |
| 9,043,038 | B2* | 5/2015 | Kempton | B60L 53/64 320/109 |
| 9,142,978 | B2* | 9/2015 | Juhasz | B60L 53/665 |
| 9,180,784 | B2* | 11/2015 | Turner | B60L 53/65 |
| 9,254,756 | B2* | 2/2016 | Miwa | B60L 53/665 |
| 9,348,381 | B2* | 5/2016 | Khoo | H04L 67/10 |
| 9,754,300 | B2* | 9/2017 | Kempton | B60L 53/305 |
| 9,789,779 | B2* | 10/2017 | Shimizu | G05B 15/02 |
| 9,853,488 | B2* | 12/2017 | Fincham | B60L 53/665 |
| 9,881,259 | B2* | 1/2018 | Forbes, Jr. | H02J 3/003 |
| 9,931,952 | B2* | 4/2018 | Tripathi | H02J 50/12 |
| 9,964,415 | B2* | 5/2018 | Ricci | G01C 21/3673 |
| 10,023,062 | B2* | 7/2018 | Kang | B60L 55/00 |
| 10,112,499 | B2* | 10/2018 | Shi | B60L 53/14 |
| 10,124,689 | B2* | 11/2018 | Han | B60L 53/31 |
| 10,169,783 | B2* | 1/2019 | Khoo | G06Q 30/0283 |
| 10,185,977 | B2* | 1/2019 | Khoo | B60L 53/67 |
| 10,185,978 | B2* | 1/2019 | Khoo | B60L 53/665 |
| 10,192,245 | B2* | 1/2019 | Khoo | H04W 4/02 |
| 10,195,950 | B2* | 2/2019 | Dow | B60L 53/65 |
| 10,210,552 | B2* | 2/2019 | Khoo | G06F 1/26 |
| 10,406,927 | B2* | 9/2019 | Baba | H02J 3/38 |
| 10,543,754 | B2* | 1/2020 | Jang | H02J 3/322 |
| 10,586,258 | B2* | 3/2020 | Khoo | G08G 1/144 |
| 10,753,761 | B2* | 8/2020 | Ricci | B60L 53/55 |
| 10,819,135 | B2* | 10/2020 | Ambroziak | B60L 53/14 |
| 10,839,433 | B2* | 11/2020 | Khoo | G06F 1/26 |
| 10,846,763 | B2* | 11/2020 | Khoo | G06Q 50/40 |
| 10,861,066 | B2* | 12/2020 | Khoo | B60L 53/68 |
| 10,872,361 | B2* | 12/2020 | Khoo | H04L 67/10 |
| 10,913,371 | B2* | 2/2021 | Baba | B60L 53/305 |
| 10,989,773 | B2* | 4/2021 | Fackelmeier | G01R 33/3692 |
| 10,998,753 | B2* | 5/2021 | Ambroziak | B60L 53/126 |
| 11,110,809 | B2* | 9/2021 | Asr | H02J 7/007188 |
| 11,267,353 | B2* | 3/2022 | Dow | H02J 3/322 |
| 11,267,359 | B2* | 3/2022 | Rieger | B60L 53/62 |
| 11,292,351 | B2* | 4/2022 | Dow | H02J 7/02 |
| 11,329,521 | B2* | 5/2022 | He | B60L 53/124 |
| 11,563,338 | B1* | 1/2023 | Ambroziak | B60L 53/126 |
| 11,575,275 | B1* | 2/2023 | Ambroziak | B60L 53/305 |
| 11,631,987 | B2* | 4/2023 | Ambroziak | B60L 3/12 320/108 |
| 11,689,043 | B2* | 6/2023 | Wiegman | B64C 29/0025 320/109 |
| 11,715,136 | B2* | 8/2023 | Khoo | B60L 53/305 700/286 |
| 11,715,138 | B2* | 8/2023 | Khoo | G06Q 10/02 700/286 |
| 11,748,788 | B2* | 9/2023 | Khoo | B60L 53/14 700/286 |
| 11,756,086 | B2* | 9/2023 | Khoo | H04L 67/10 700/286 |
| 11,756,087 | B2* | 9/2023 | Khoo | H01M 10/44 700/286 |
| 11,990,788 | B2* | 5/2024 | Ambroziak | B60L 55/00 |
| 2008/0052026 | A1* | 2/2008 | Amidon | H04N 21/6547 713/1 |
| 2009/0021218 | A1* | 1/2009 | Kelty | G06Q 50/06 705/412 |
| 2009/0212745 | A1* | 8/2009 | Kelty | B60L 3/0092 320/162 |
| 2009/0216688 | A1* | 8/2009 | Kelty | G06Q 50/06 320/155 |
| 2009/0287578 | A1* | 11/2009 | Paluszek | G06Q 20/204 705/17 |
| 2009/0315512 | A1* | 12/2009 | Ichikawa | B60L 50/61 320/109 |
| 2010/0017045 | A1* | 1/2010 | Nesler | B60L 53/665 700/295 |
| 2010/0017249 | A1* | 1/2010 | Fincham | H02J 7/1446 320/108 |
| 2010/0094496 | A1* | 4/2010 | Hershkovitz | B60L 50/66 701/22 |
| 2010/0185357 | A1* | 7/2010 | Mizumachi | B60L 53/14 701/31.4 |
| 2011/0133693 | A1* | 6/2011 | Lowenthal | B60L 53/60 320/109 |
| 2011/0172837 | A1* | 7/2011 | Forbes, Jr. | H02J 3/004 700/291 |
| 2011/0184585 | A1* | 7/2011 | Matsuda | H04L 63/12 700/297 |
| 2011/0202192 | A1* | 8/2011 | Kempton | B60L 53/68 320/109 |
| 2011/0202217 | A1* | 8/2011 | Kempton | H02J 3/008 320/109 |
| 2011/0202418 | A1* | 8/2011 | Kempton | B60L 53/64 705/26.1 |
| 2011/0239116 | A1* | 9/2011 | Turner | B60L 53/65 715/810 |
| 2011/0276194 | A1* | 11/2011 | Emalfarb | B60L 53/66 700/297 |
| 2012/0086395 | A1* | 4/2012 | Kim | H04Q 9/00 320/109 |
| 2012/0101659 | A1* | 4/2012 | Kim | B60L 1/003 701/2 |
| 2012/0268061 | A1* | 10/2012 | Bhageria | B60L 53/65 320/107 |
| 2013/0099741 | A1* | 4/2013 | Shimizu | B60L 53/00 320/109 |
| 2013/0110296 | A1* | 5/2013 | Khoo | B60L 53/14 700/286 |
| 2013/0119920 | A1* | 5/2013 | Hsu | B60L 53/665 320/109 |
| 2013/0175974 | A1* | 7/2013 | Bassham | B60L 58/15 320/109 |
| 2013/0179061 | A1* | 7/2013 | Gadh | B60L 53/305 701/1 |
| 2013/0320919 | A1* | 12/2013 | Adames | H02J 7/35 320/107 |
| 2013/0342164 | A1* | 12/2013 | Choi | B60L 53/18 320/109 |
| 2014/0005848 | A1* | 1/2014 | Melen | G06Q 10/06311 700/291 |
| 2014/0006137 | A1* | 1/2014 | Melen | G06Q 10/1093 705/14.35 |
| 2014/0091747 | A1* | 4/2014 | Uyeki | B60L 53/64 320/101 |
| 2014/0097795 | A1* | 4/2014 | Turner | B60L 53/67 320/109 |
| 2014/0125279 | A1* | 5/2014 | Juhasz | H02J 7/00 320/109 |
| 2014/0125281 | A1* | 5/2014 | Mitsutani | B60L 1/003 320/109 |
| 2014/0188367 | A1* | 7/2014 | North | B60L 53/305 701/1 |
| 2014/0289082 | A1* | 9/2014 | Seo | B60L 53/65 701/2 |
| 2014/0300316 | A1* | 10/2014 | Miwa | B60L 53/665 320/108 |
| 2014/0312841 | A1* | 10/2014 | Baba | B60L 55/00 320/109 |
| 2014/0358749 | A1* | 12/2014 | Williams | G06Q 30/04 705/34 |
| 2014/0365025 | A1* | 12/2014 | Forbes, Jr. | G05F 1/66 700/295 |

(56) References Cited

U.S. PATENT DOCUMENTS

| | | | |
|---|---|---|---|
| 2015/0095114 A1* | 4/2015 | Hyde | B60L 58/40 705/7.38 |
| 2016/0031333 A1* | 2/2016 | Dow | B60L 53/38 307/10.1 |
| 2016/0052413 A1* | 2/2016 | Shimizu | H04W 4/027 700/291 |
| 2016/0126639 A1* | 5/2016 | Kim | H04B 5/72 307/104 |
| 2016/0159239 A1* | 6/2016 | Shi | B60L 53/14 320/134 |
| 2016/0193931 A1* | 7/2016 | Adachi | B60L 53/14 307/10.1 |
| 2016/0232555 A1* | 8/2016 | Satou | G06Q 30/0226 |
| 2016/0318417 A1* | 11/2016 | Suzuki | H01M 10/486 |
| 2016/0339792 A1* | 11/2016 | Khoo | B60L 53/12 |
| 2016/0339793 A1* | 11/2016 | Khoo | G06Q 30/0206 |
| 2016/0362016 A1* | 12/2016 | Khoo | B60L 53/665 |
| 2016/0364658 A1* | 12/2016 | Khoo | B60L 53/65 |
| 2016/0364776 A1* | 12/2016 | Khoo | G06Q 20/24 |
| 2017/0138758 A1* | 5/2017 | Ricci | B60L 58/21 |
| 2017/0141368 A1* | 5/2017 | Ricci | B60L 53/52 |
| 2017/0337646 A1* | 11/2017 | Zhou | B60L 58/12 |
| 2018/0009325 A1* | 1/2018 | Jang | H02J 7/0044 |
| 2018/0072171 A1* | 3/2018 | Han | B60L 53/31 |
| 2018/0131221 A1* | 5/2018 | Ambroziak | G06Q 30/0283 |
| 2019/0106012 A1* | 4/2019 | Freund | B60L 53/30 |
| 2019/0139107 A1* | 5/2019 | Khoo | G06Q 10/02 |
| 2019/0156382 A1* | 5/2019 | Khoo | B60L 53/64 |
| 2019/0156383 A1* | 5/2019 | Khoo | B60L 53/665 |
| 2019/0156384 A1* | 5/2019 | Khoo | G08G 1/144 |
| 2019/0180336 A1* | 6/2019 | Khoo | B60L 53/64 |
| 2019/0366871 A1* | 12/2019 | Baba | H02J 3/322 |
| 2020/0047622 A1* | 2/2020 | Asr | H02J 7/007188 |
| 2020/0057125 A1* | 2/2020 | Fackelmeier | G01R 33/3628 |
| 2020/0262303 A1* | 8/2020 | Dow | B60L 58/12 |
| 2020/0361332 A1* | 11/2020 | Rieger | B60L 58/13 |
| 2020/0403437 A1* | 12/2020 | Ambroziak | B60L 55/00 |
| 2021/0008996 A1* | 1/2021 | Dow | B60L 53/62 |
| 2021/0073876 A1* | 3/2021 | Khoo | H04L 63/10 |
| 2021/0090139 A1* | 3/2021 | Khoo | B60L 53/31 |
| 2021/0090140 A1* | 3/2021 | Khoo | H04L 25/20 |
| 2021/0090141 A1* | 3/2021 | Khoo | G06Q 20/24 |
| 2021/0110446 A1* | 4/2021 | Khoo | G06Q 20/24 |
| 2021/0122261 A1* | 4/2021 | Qiao | H04W 4/40 |
| 2021/0210991 A1* | 7/2021 | He | H02J 50/12 |
| 2021/0273478 A1* | 9/2021 | Ambroziak | B60L 3/12 |
| 2022/0097552 A1* | 3/2022 | Dow | B60L 58/12 |
| 2022/0203853 A1* | 6/2022 | Dow | B60L 58/12 |
| 2022/0203861 A1* | 6/2022 | Dow | B60L 55/00 |
| 2022/0302740 A1* | 9/2022 | Ambroziak | G06Q 30/0283 |
| 2022/0305942 A1* | 9/2022 | Mannepalli | B60L 53/60 |
| 2023/0060523 A1* | 3/2023 | Dow | B60L 53/67 |
| 2023/0064812 A1* | 3/2023 | Dow | B60L 55/00 |
| 2023/0122010 A1* | 4/2023 | Qiao | B60L 53/65 320/109 |
| 2023/0136908 A1* | 5/2023 | Wiegman | H02J 7/007182 320/109 |
| 2023/0166615 A1* | 6/2023 | Dow | B64C 39/024 701/3 |
| 2023/0166618 A1* | 6/2023 | Dow | B60L 53/38 |
| 2023/0166619 A1* | 6/2023 | Dow | B60L 53/305 320/109 |
| 2023/0166867 A1* | 6/2023 | Dow | B64F 1/362 320/108 |
| 2023/0322117 A1* | 10/2023 | Kwon | H04W 4/46 |
| 2023/0352963 A1* | 11/2023 | Ambroziak | B60L 53/64 |
| 2023/0401613 A1* | 12/2023 | Khoo | G01C 21/3492 |
| 2023/0406143 A1* | 12/2023 | Dow | G06Q 10/0631 |
| 2023/0406144 A1* | 12/2023 | Dow | B60L 53/14 |
| 2023/0408273 A1* | 12/2023 | Dow | B60L 53/305 |
| 2023/0410162 A1* | 12/2023 | Khoo | H04W 4/023 |

FOREIGN PATENT DOCUMENTS

| | | | | |
|---|---|---|---|---|
| DE | 102019206334 A1 | * | 11/2020 | E05D 11/0081 |
| EP | 2 768 695 B1 | | 2/2021 | |
| EP | 4292869 A1 | * | 12/2023 | B60L 53/12 |
| JP | 2020-91771 A | | 6/2020 | |
| JP | 2020091771 A | * | 6/2020 | |
| KR | 101716610 B1 | * | 4/2017 | |
| WO | WO-2014176838 A1 | * | 11/2014 | H02J 5/005 |

* cited by examiner

COMMUNICATION METHOD BETWEEN ELECTRIC VEHICLE, SUPPLY EQUIPMENT AND POWER GRID OPERATION SERVER

CROSS-REFERENCE TO RELATED APPLICATION

This application claims priority to and the benefit of Korean Patent Application Nos. 2020-0126298 and 2020-0126303, filed on Sep. 28, 2020, the disclosures of which are incorporated herein by reference in its entirety.

BACKGROUND

1. Field

The present invention relates to a vehicle-to-grid (V2G) communication interface.

2. Discussion of Related Art

V2G is an abbreviation of "vehicle to grid," which refers to the transfer of electric energy from an electric vehicle to a power grid. That is, V2G is a technology that connects a vehicle battery mounted on an electric vehicle and a power grid by using the vehicle battery as an energy storage device.

The existing V2G communication standard does not define a specific communication interface related to a charge schedule and an efficient billing policy based on the charge schedule.

SUMMARY OF THE INVENTION

The present invention is directed to providing a communication method between an electric vehicle, a supply equipment, and a power grid system to define a communication interface related to a charge process for an effective billing policy, and a power transmission device embedded in the electric vehicle.

These and other objects, advantages and features of the present invention, and implementation methods thereof will be clarified through the following embodiments described with reference to the accompanying drawings.

According to an aspect of the present invention, there is provided a method of communicating between an electric vehicle, a supply equipment, and a power grid operation server, which is performed by an electric vehicle communication controller of the electric vehicle, the method including transmitting a message related to the charge schedule including a charge start time and a charge finish time with the lowest charge cost, a mileage input by a vehicle user through a human-machine interface and the amount of energy charge calculated according to the mileage to a supply equipment communication controller of the supply equipment and to a power grid communication controller of the power grid operation server via the supply equipment communication controller, receiving a message related to a charge cost calculated according to the charge schedule from the supply equipment communication controller as a charge cost to be paid to the supply equipment, transmitting an authorization message for the charge cost to the supply equipment communication controller, and exchanging a message indicating that the electric vehicle is ready for charging with the supply equipment communication controller in order to start charging the electric vehicle.

According to an aspect of the present invention, there is provided an electric vehicle including a human-machine interface configured to set up a charge schedule, an electric vehicle communication controller configured to communicate with a supply equipment communication controller of a supply equipment to exchange a message related to the charge schedule and an on-board charger configured to receive electric energy from an off-board charger of the supply equipment according to the charge schedule, wherein the electric vehicle communication controller transmits, to the supply equipment communication controller, a message related to the charge schedule including a charge start time and a charge finish time with the lowest charge cost, a mileage input through the human-machine interface and the amount of energy charge, a charge start time, and a charge finish time calculated according to the mileage and receives, from the supply equipment communication controller, a message related to a charge cost calculated according to the charge schedule as a charge cost to be paid to the supply equipment.

DETAILED DESCRIPTION OF EXEMPLARY EMBODIMENTS

Figure 1:
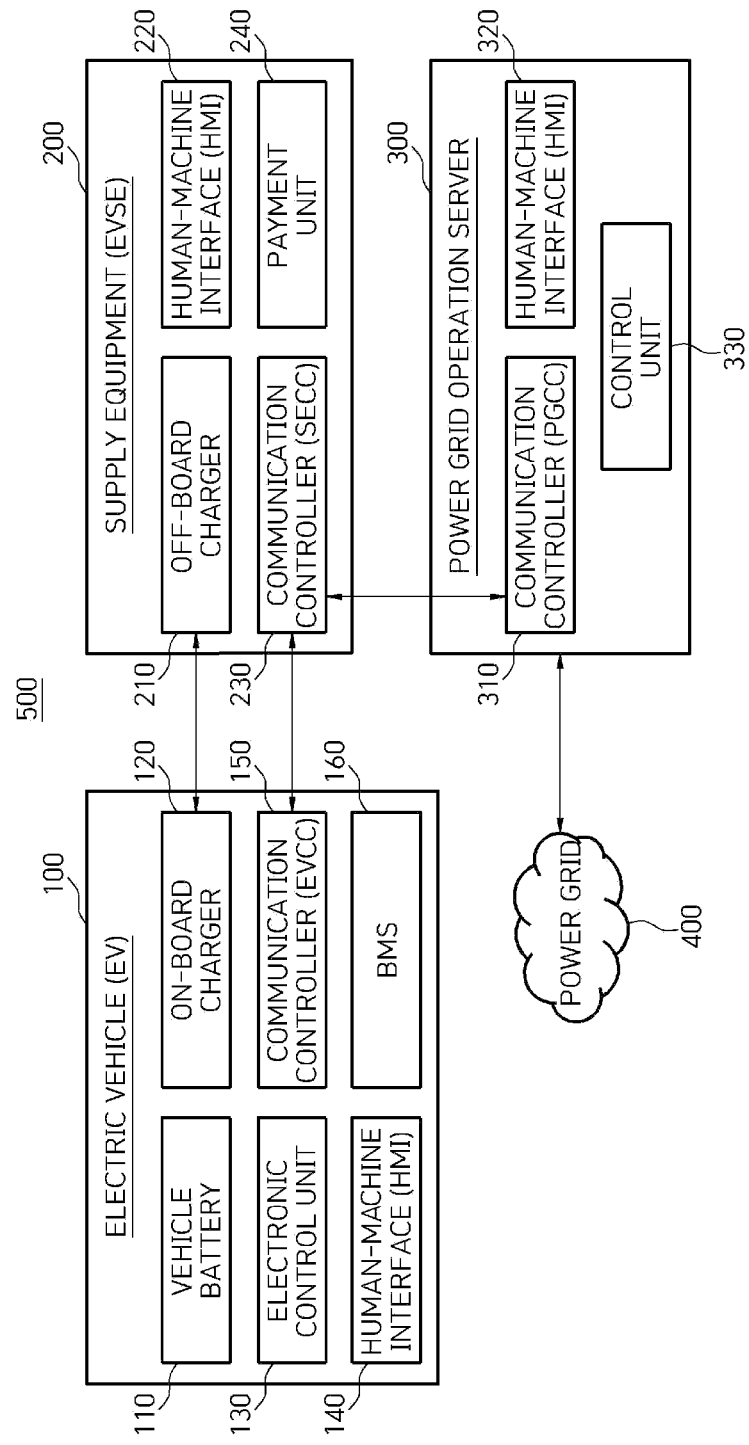
FIG. 1 is an overall configuration diagram of a vehicle-to-grid (V2G) system according to an embodiment of the present invention.

Hereinafter, embodiments of the present invention will be described in detail to be easily embodied by those skilled in the art with reference to the accompanying drawings. The present invention may, however, be embodied in many different forms and should not be construed as being limited to the embodiments set forth herein. The present invention may, however, be embodied in many different forms and should not be construed as being limited to the embodiments set forth herein. In the accompanying drawings, a portion irrelevant to a description of the present invention will be omitted for clarity. Like reference numerals refer to like elements throughout. Also, in providing description with reference to the drawings, although elements are represented by the same name, reference numerals referring to the elements may be changed, and reference numerals are merely described for convenience of description. It should not be construed that concepts, features, functions, or effects of elements are limited by reference numerals.

In the following description, the technical terms are used only for explaining a specific exemplary embodiment while not limiting the present invention. The terms of a singular form may include plural forms unless referred to the contrary.

It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Hereinafter, before describing specific embodiments of the present invention in detail, the scope of the present invention and terms used in the present specification are defined as follows.

The present invention is applicable to communication between an electric vehicle (EV) and an electric vehicle supply equipment (EVSE).

In addition, the present invention is also applicable to electric vehicles used for carriage of passengers, electric vehicles used for carriage of goods, and electric vehicles of other categories.

Also, the present invention is applicable to high-level communication (HLC) related to conductive and wireless power transfer technologies.

Also, the present invention is applicable to technical fields in which energy is transferred from an EVSE to an EV to charge a battery of the EV and in which energy is transferred from an EV to an EVSE so that the energy can be supplied to homes, loads, or grids.

Also, the present invention is applicable to technical fields related to charge or discharge control, payment, load leveling, and privacy.

Electric Vehicle Communication Controller (EVCC) An EVCC is an in-vehicle system that implements communication between an EV and a supply equipment communication controller (SECC) in order to support a specific function.

These specific functions include input and output channel control, encryption, data transfer between a vehicle and an SECC, and the like.

Supply Equipment Communication Controller (SECC): The SECC is an entity capable of communicating with one or multiple EVCCs and interacting with a secondary actor.

Electric Vehicle Supply Equipment ID (EVSE ID): An EVSE ID is a unique ID of a charging place.

Secondary Actor: A secondary actor is an entity that is indirectly involved in an energy transfer process including a charge process and a discharge process. The secondary actor may include, for example, an electric vehicle service operator information management office (E-Mobility Operator Clearing House), a demand information management office (Demand Clearing House), an electric vehicle operator (Fleet Operator), an electric vehicle service operator (E-Mobility Operator), a distribution system operation (Distribution System Operator), an electricity meter operator, an electric provider, and the like. Payment Unit: A payment unit is an internal device of a supply equipment that provides a payment method. Here, the payment method may be external identification means (EIM), cash, a credit card, etc. Here, the EIM refers to an external means that allows a vehicle user to identify his or her contract or EV and may include, for example, near field communication (NFC), radio-frequency identification (RFID), short message service (SMS), and so on.

When an EVCC normally selects a payment method, the payment unit informs an SECC of whether a customer is authorized.

Amount of Energy Charge: The amount of energy charge may be energy required for an EV until departure time is reached. The amount of energy charge may be, for example, energy at which the state of charge (SOC) of a vehicle battery is equal to 100% or close to 100% (e.g., 80%). Here, the departure time may be the time when a vehicle user unplugs a vehicle's charging plug or the time when a vehicle user leaves a charging station.

Amount of Energy Discharge: The amount of energy discharge may be defined as energy transferred from an EV to an EVSE or to a power grid via an EVSE according to a target value or a discharge schedule set up by a user.

Vehicle User: A vehicle user may be defined as an individual or legal entity that uses a vehicle and provides information necessary for driving and thus influences a charging pattern and/or a discharging pattern.

Authentication: Authentication is a procedure performed between an EVCC and an SECC or between a vehicle user and an EVSE or a secondary actor in order to prove whether provided information (ID, etc.) is correct and valid or whether the provided information belongs to an EVCC, a vehicle user, and an SECC Service Provider: A service provider may be defined as a secondary actor that provides value-added services to customers through an operator of an EVSE.

Authorization: Authorization may be defined as a procedure in which an EVSE checks whether an EV is authorized to be charged or discharged or vice versa.

Charger: A charger may be defined as a power conversion device that performs essential functions for charging and discharging batteries.

Charge Schedule: a charge schedule may be defined as a plan including charging limits of an EV for a specific period of time. A charge schedule may be an energy transfer schedule related to energy transferred from a power grid to an EV.

Charging Limits: Charging limits may be defined as physical constraints (e.g., voltage, current, energy, and power) negotiated during a V2G communication session during a charging session.

Charging Session: A charging session may be defined as a period of time between the start (cable connection) and the end (cable disconnection) of a charge process.

Discharge Schedule: A discharge schedule may be defined as a plan including discharging limits of an EV for a specific period of time. A discharge schedule may be an energy transfer schedule related to energy transferred from an EV to a power grid.

Battery Management System (BMS): A BMS may be defined as an electronic apparatus that controls or manages electrical and thermal functions of a vehicle battery and provides communication between the vehicle battery and another vehicle controller.

Discharging Limits: Discharging limits may be defined as physical constraints (e.g., voltage, current, energy, and power) negotiated during a V2G communication session during a discharging session.

Discharging Session: A discharging session may be defined as a period of time between the start (cable connection) and the end (cable disconnection) of a discharge process.

Grid Schedule: A grid schedule may be defined as a function of setting a power level at a specific time based on a local grid situation. Parameters for calculating the grid schedule may include, for example, an actual or predicted demand and supply situation of a local grid.

Identification: Identification may be defined as a procedure in which an EVCC or a user provides identification information (identification code) for authentication or a procedure in which an SECC provides an EVSE ID to an EVCC.

Sales Tariff Table: A sales tariff table is used to provide an input value for calculating a charge schedule and/or a discharge schedule. A sales tariff table may be issued by a secondary actor, such as an electric provider and an electric vehicle service operator. A sales tariff table reflects the "balance of supply and demand of an electric provider" and the "use of green energy." A sales tariff table may be regularly updated.

Electric Provider: An electric provider is a secondary actor that supplies electricity.

Hereinafter, embodiments of the present invention will be described in detail with reference to the drawings.

FIG. 1 is an overall configuration diagram of a vehicle-to-grid (V2G) system according to an embodiment of the present invention.

Referring to FIG. 1, a V2G system 500 according to an embodiment of the present invention provides a communication interface related to a charge process for an effective billing policy.

To this end, the V2G system 500 includes an electric vehicle (EV) 100, an electric vehicle supply equipment (EVSE) 200, and a power grid operation server 300.

Electric Vehicle (EV) 100: The EV 100 may be a battery-electric vehicle (BEV) or a plug-in hybrid electric vehicle (PHEV).

The EV 100 is connected to a power grid 400 via the EVSE 200. Also, the EV 100 receives electric energy (or power) from the power grid 400 via the EVSE 200 (charging) and supplies electric energy (or power) to the power grid 400 via the EVSE 200 (discharging).

The EV 100 includes a vehicle battery 110, an on-board charger (OBC) 120, an electronic control unit 130, a human-machine interface (HMI) 140, an electric vehicle communication controller (EVCC) 150, and a battery management system (BMS) 160.

The vehicle battery 110 is a high-voltage battery installed in the EV 100 and may be referred to as a rechargeable energy storage system (RESS).

The OBC 120 may be configured to include a power conversion device installed in the EV 100. The power conversion device may be a two-way charger that performs an essential function for charging or discharging the vehicle battery 110.

The OBC 120 may exchange commands and/or information related to the charging or discharge process with the EVCC 150.

The OBC 120 may be configured to further include a control chip having a data processing function (including a processor, a memory, etc.) so as to exchange the information and/or commands with the EVCC 150.

Meanwhile, FIG. 1 shows that the EVCC 150 and the OBC 120 are separated from each other, but the EVCC 150 may be consolidated into the OBC 120. In this case, the OBC 120 may be a device configured to include the power conversion device, the control chip, and the EVCC 150.

The electronic control unit 130 may be a unit that provides information related to the EV 100. The information related to the EV 100 may be vehicle driving-related information.

The HMI 140 may have an interfacing function for displaying information related to a charging or discharge process and inputting information and/or commands related to a charging or discharge process.

The input of all the information and/or commands or the display of all the information and/or commands may be performed through the HMI 140.

The HMI 140 may be configured to include a "charge button" and a "discharge button" for a vehicle user to start the charging or discharge process.

The HMI 140 may be a display device having an input function for a vehicle user to input the information related to the charging or discharge process.

For example, the display device may be a central information display (CID) that has a cluster informing about the velocity, mileage, battery status, and normal operation of the EV 100 and audio, video, and navigation (AVN) functions embedded therein to display and control the operation states of various devices in the EV 100.

The display device displays information related to the progress of the charging or discharge process in addition to the input of the information related to the charging or discharge process.

The EVCC 150 may be an in-vehicle system that implements communication between the EV 100 and a supply equipment communication controller (SECC) 230 so as to support a specific function.

The communication between the EVCC 150 and the SECC 230 may be, for example, power line communication (PLC). It is assumed that the term "electric vehicle" used herein refers to an electric vehicle with a power line communication (PLC) function.

The PCL may be referred to as power-line carrier, mains communication, power-line telecom (PLT), or power-line networking (PLN).

The PLC may be used as a term to describe several different systems for carrying information over power lines.

The EVCC 150 may be configured to include a memory, a processor, and a communicator.

The memory includes a volatile and/or non-volatile storage medium for storing messages related to the charging or discharge process based on a protocol agreed with the SECC 230.

The processor processes messages received from the SECC 230 or processes messages to be transmitted to the SECC 230.

The communicator may be a hardware element configured to transmit a message related to the charging or discharge process to the SECC 230 or receive a message related to the charging or discharge process from the SECC 230 on the basis of an agreed communication method, e.g., PLC. The communicator may include multiple hardware components for providing modulation, demodulation, filtering, and amplification functions.

The EVSE 200 may be a device configured to deliver energy (e.g., power, voltage, current, or the like) from the premises wiring to the EV 100 and receive energy (e.g., power, voltage, current, or the like) from the EV 100.

The EVSE 200 may be configured to include a phase(s), neutrals, protective earth conductors, EV couplers, attached plugs, accessories, power outlets, electrical outlets or appliances, and the like.

The EVSE 200 may be configured to include an off-board charger 210, an HMI 220, an SECC 230, and a payment unit 240.

The off-board charger 210 may be configured to include a power conversion device installed in the EVSE 200. The power conversion device in the off-board charger 210 may be a two-way charger that transfers energy to the OBC 120 installed in the EV 100 or receives energy from the OBC 120.

From the standpoint of the off-board charger 210, transferring energy to the OBC 120 indicates charging, and receiving energy from the OBC 120 indicates discharging. From the standpoint of the EV, discharging is transferring energy to an off-board charger and thus indicates electricity generation.

The off-board charger 210 exchanges commands and/or information related to the charging or discharge process with the SECC 230. To this end, the off-board charger 210 may be configured to further include a control chip that processes commands and/or information transmitted to the SECC 230 or received from SECC 230. The control chip may be configured to basically include a processor and a memory mounted on one board.

FIG. 1 shows that the off-board charger 210 and the SECC 230 are separated from each other, but the SECC 230 may be built in the off-board charger 210. In this case, the off-board charger 210 may be configured to include the power conversion device, the control chip, and the SECC 230.

The HMI 220 has an interfacing function for displaying the commands and/or information related to the charging or discharge process and inputting the commands and/or information to the off-board charger 210 or the SECC 230 of the EVSE 200.

The input of all the information and/or commands and the display of all the information and/or commands may be performed through the HMI 220.

The HMI 220 may be configured to include a "charge button" and a "discharge button" for a vehicle user to input commands and/or information related to a charge or discharge schedule and a charging or discharge process.

The HMI 220 may be a display device having an input function for a vehicle user to input commands and/or information related to a charge or discharge schedule and a charging or discharge process. The display device displays various pieces of information associated with charging or discharging progress in addition to the input function.

The SECC 230 is an entity capable of communicating with one or multiple EVCCs and interacting with a secondary actor.

Examples of the secondary actor have been described in the "Definition of Terms" section. In FIG. 1, the power grid operation server 300 may be included in the secondary actor.

FIG. 1 shows one-to-one communication between one SECC 230 and one EVCC 150. The present invention is not limited thereto, and when one SECC 230 communicates with multiple EVCCs, the SECC 230 manages the multiple EVCCs and recognizes the clusters of the outlets to which the EVCCs are connected.

The SECC 230 may be configured to include a memory, a processor, and a communicator.

The memory may be a volatile or non-volatile storage medium for storing messages related to the charging or discharge process on the basis of a communication protocol (communication standard) agreed with the EVCC 150.

The processor processes messages received from the EVCC 150 or processes messages to be transmitted to the EVCC 150.

The communicator may be a hardware element configured to transmit a message related to the charging or discharge process to the EVCC 150 or receive a message related to the charging or discharge process from the EVCC 150 on the basis of an agreed communication method, e.g., PLC. The communicator may include multiple hardware components for providing modulation, demodulation, filtering, and amplification functions.

The SECC 230 may communicate with the power grid operation server 300. In this case, a gateway, a router, and the like may be interposed between the SECC 230 and the power grid operation server 300.

The SECC 230 may transmit or receive any information and/or command related to the charging or discharge process to or from the power grid operation server 300.

The power grid operation server 300 mediates between the SECC 230 and the power grid 400. The power grid 400 includes local transformers, distribution grids, power substations, transmission grids, transmission substations, and power plants (including renewable energy).

The power grid operation server 300 may be an entity for grid negotiation that provides information on the load of the grid.

The power grid operation server 300 collects and monitors any necessary information for any parts of the power grid 400, for example, current and expected loads of local transformers, distribution grids, power substations, transmission grids, transmission substations, and power plants.

The collected current load or expected load is utilized for the EV 100 or the EVSE 200 to set up a charge or discharge schedule.

In addition, the collected current load or expected load is utilized to calculate the cost (charge cost and discharge cost) related to the charging or discharging of an EV. For example, a sales tariff table for calculating the charging related cost or discharging is based on the current load or expected load.

The power grid operation server 300 may provide information required to set up the charge or discharge schedule in the EVCC 150 or the SECC 230 to the EVCC 150 or the SECC 230.

The collection and provision of the information performed by the power grid operation server 300 may be performed by a power grid communication controller (PGCC) 310.

The PGCC 310 is configured to include a memory configured to store information collected from the power grid 400 and information collected from the EV 100 and/or the EVSE 200, a processor having a data processing function to process the collected information, and a communicator configured to transmit the processed information to the SECC 230.

An HMI 320 of the power grid operation server 300 displays information collected by the power grid operation server 300 and delivers information input by an operator of the power grid operation server 300 to the PGCC 310.

The HMI 320 may be a display device, and the display device has an input function. The display device displays and provides any collected information to the operator of the power grid operation server 300.

A control unit 330 of the power grid operation server 300 manages and controls the operations of the PGCC 310 and the HMI 320.

The control unit 330 includes at least one processor having a data processing function and a computational function. The control unit 330 creates and processes a message based on a communication protocol agreed between the PGCC 310 and the SECC 230.

The power grid operation server 300 may consolidate grid information collected from the power grid 400 into grid profile and may provide the grid profile to the SECC 230 and/or the EVCC 150.

The EV 100 and the EVSE 200 may set up the charge or discharge schedule on the basis of the grid profile provided from the power grid operation server 300.

Also, the power grid operation server 300 may provide a proposal for the charge or discharge schedule to the SECC 230 on the basis of the grid profile.

When the grid profile is changed, the power grid operation server 300 may inform the SECC 230 of necessity for an updated charge or discharge schedule (or an updated energy transfer schedule).

When the power grid operation server 300 is referred to as a distribution system, the power grid operation server 300 may be a server responsible for voltage stability in a distribution grid.

The power grid 400 may be used as a term including a distribution system network, and the distribution system network carries electricity from a transmission grid to consumers.

The distribution system network includes medium-voltage power lines, electrical substations, low-voltage distribution wiring networks, associated equipment, and the like.

A communication protocol defining communication between the EVCC 150 and the SECC 230 may be the same as or different from a communication protocol defining communication between the SECC 230 and the PGCC 310.

When the communication protocols are different, the SECC 230 may convert and process commands and/or information related to the charge or discharge schedule received from the EVCC 150 using a communication protocol agreed with the PGCC 310.

Conversely, when the communication protocols are different, the SECC 230 may convert and process commands and/or information related to the charge or discharge schedule received from the PGCC 310 using a communication protocol agreed with the EVCC 150.

The communication between the EVCC 150 and the SECC 230 may be classified into a local communication connection and a remote communication connection.

Figure 2:
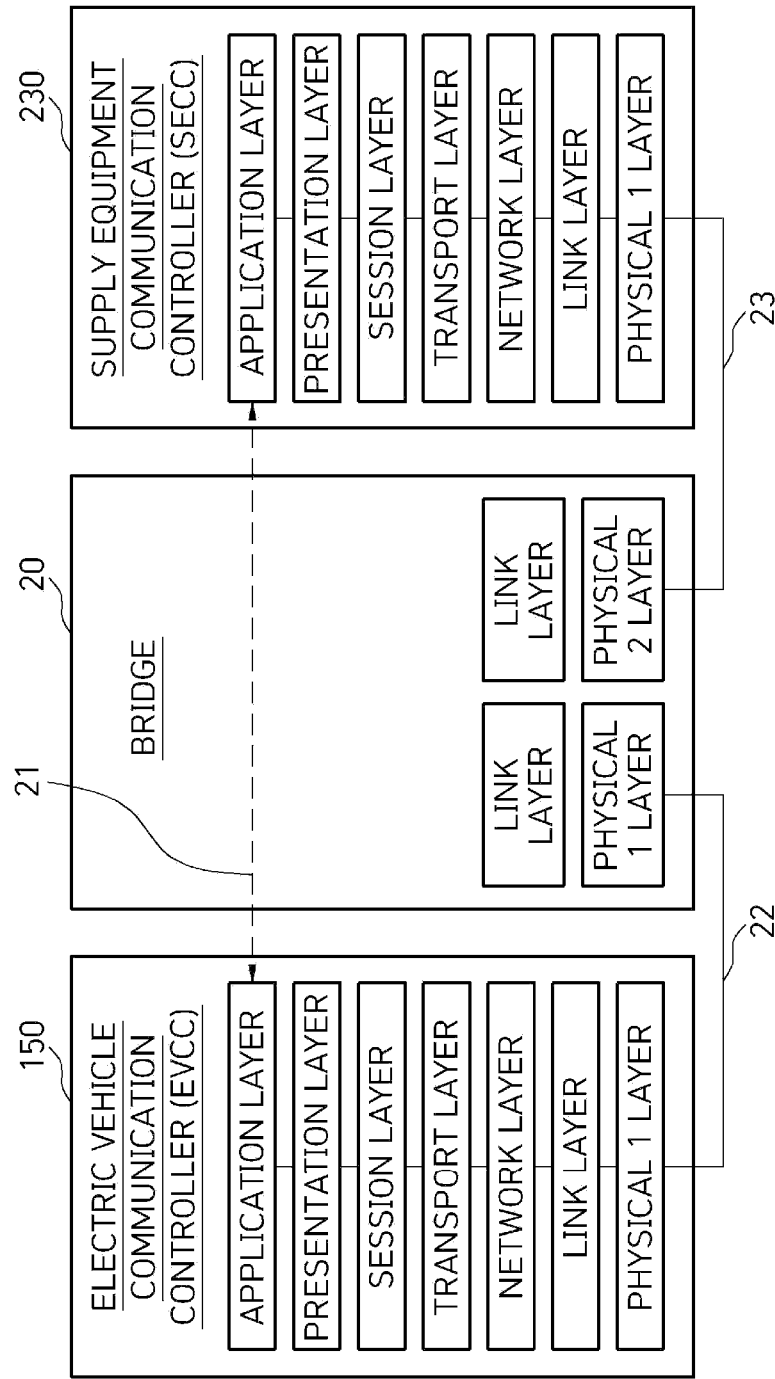
FIG. 2 is a diagram illustrating a local communication connection between an electric vehicle communication controller and a supply equipment communication controller using the open systems interconnection (OSI) layers according to an embodiment of the present invention.

FIG. 2 is a diagram illustrating a local communication connection between an electric vehicle communication controller and a supply equipment communication controller using the open systems interconnection (OSI) layers according to an embodiment of the present invention.

Referring to FIG. 2, when the EVCC 150 and the SECC 230 are locally connected, the EVCC 150 and the SECC 230 perform communication (21) in the same application layer through a bridge 20.

Physical 1 Layer of the EVCC 150 performs communication (22) with Physical 1 Layer of the bridge 20, and Physical 1 Layer of the bridge 20 and Physical 1 Layer of the SECC perform communication (23).

The bridge 20, a PLC chip for processing PLC, and the SECC 230 may be included in a circuit implemented in the same board (substrate).

Figure 3:
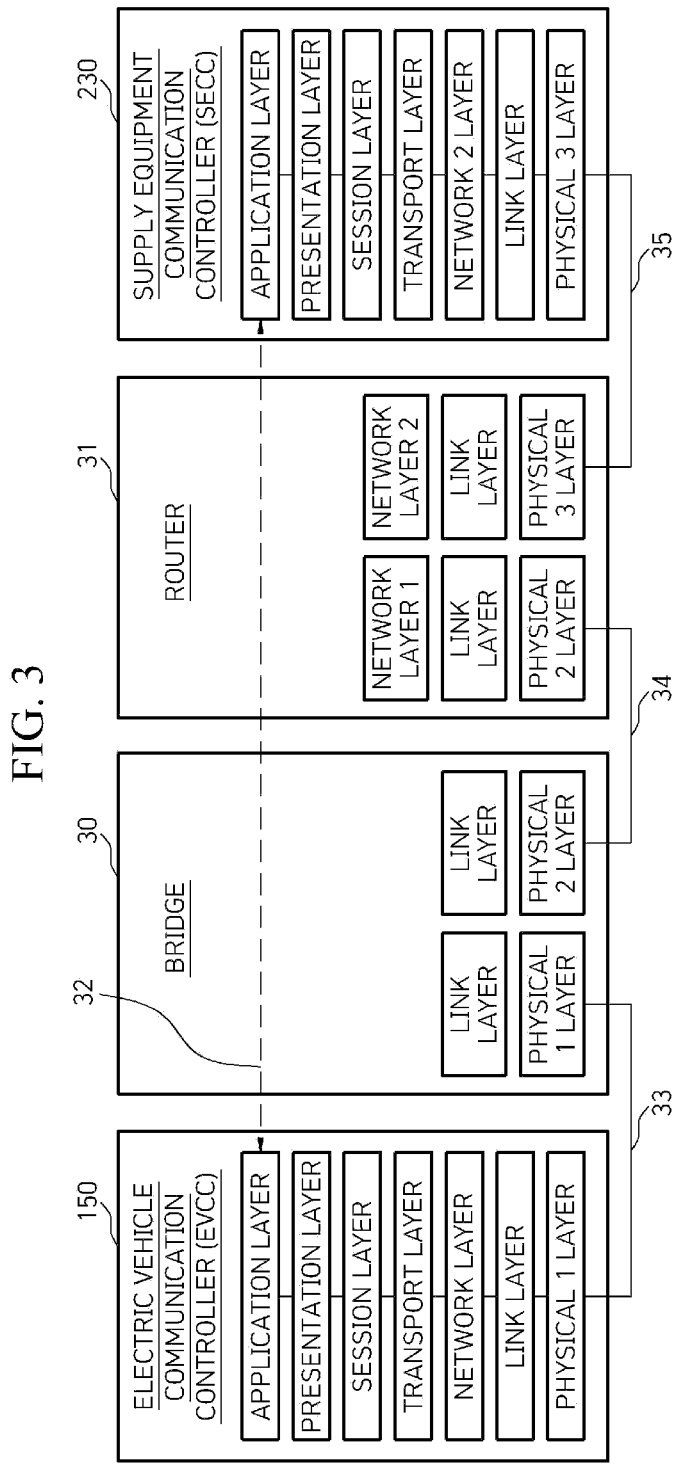
FIG. 3 is a diagram illustrating a remote communication connection between an electric vehicle communication controller and a supply equipment communication controller using the OSI layers according to another embodiment of the present invention.

FIG. 3 is a diagram illustrating a remote communication connection between an electric vehicle communication controller and a supply equipment communication controller using the OSI layers according to another embodiment of the present invention.

Referring to FIG. 3, for a remote communication connection between the EVCC 150 and the SECC 230, a bridge 30 and a router 31 may be designed therebetween. In this case, the bridge 30 may be optional or have multiple bridges depending on the design architecture.

Through the bridge 30 and the router 31, the EVCC 150 and the SECC 230 perform communication (32) in the same application layer.

Physical 1 Layer of the EVCC 150 and physical 1 Layer of the bridge 30 perform communication (33), and Physical 2 Layer of the bridge 30 and Physical 2 Layer of the router 31 perform communication (34). Also, Physical 3 Layer of the router 31 and Physical 3 Layer of the SECC 230 perform communication (35).

Figure 4:
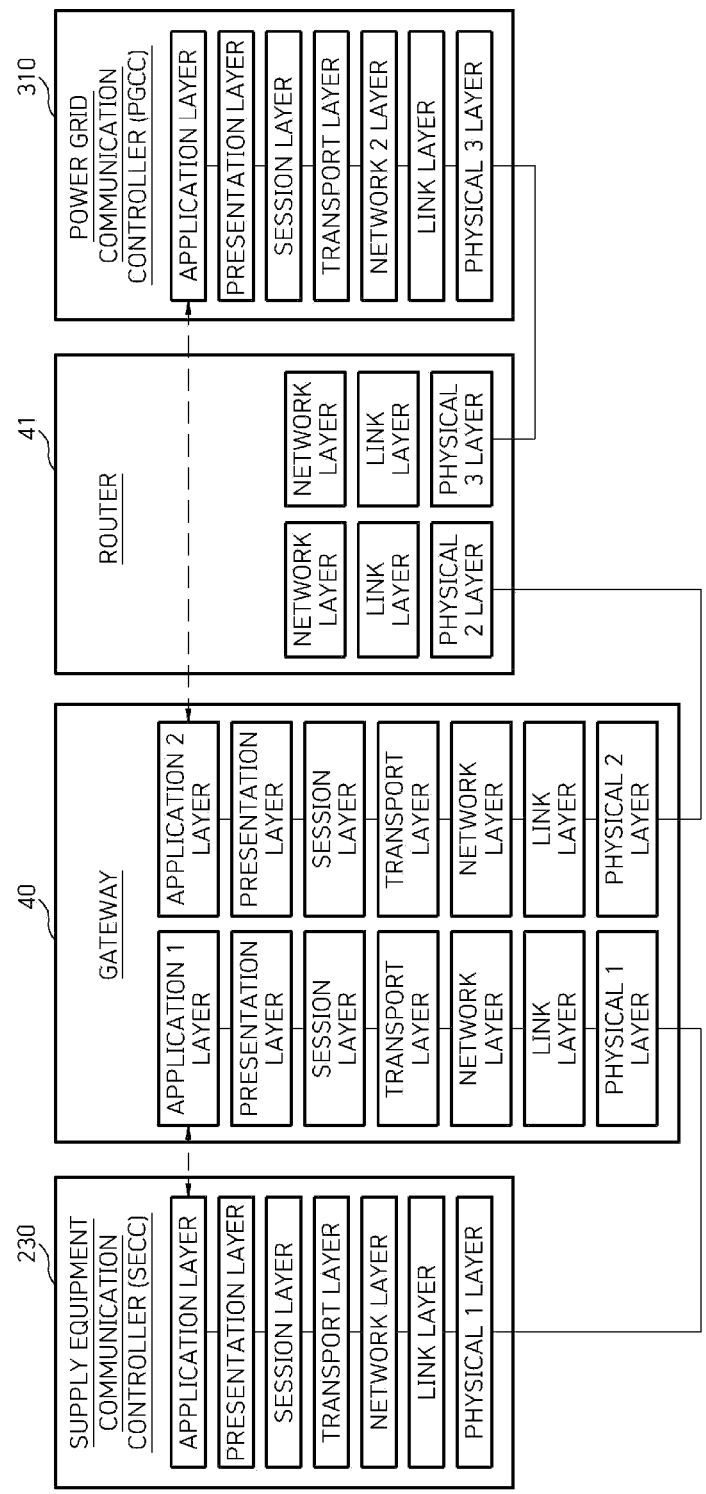
FIG. 4 is a diagram illustrating a communication connection between a supply equipment communication controller and a power grid communication controller using the OSI layers according to still another embodiment of the present invention.

FIG. 4 is a diagram illustrating a communication connection between an SECC and a PGCC using the OSI layers according to still another embodiment of the present invention.

Referring to FIG. 4, for a communication connection between the SECC 230 and the PGCC 310, a gateway 40 and a router 41 may be designed therebetween. The designing of the router 41 may be optional.

The gateway 40, the router 41, a PLC chip, and the SECC 230 may be mounted on the same board and configured as one circuit.

The application layer of the SECC 230 performs communication with Application 1 Layer of the gateway 40, and Application 2 Layer of the gateway 40 performs communication with the application layer of the PGCC 310 through the router 41.

Physical 1 Layer of the SECC 230 performs communication with Physical 1 Layer of the gateway 40, and Physical 2 Layer of the gateway 40 may perform communication with Physical 2 Layer of the router 41. Also, Physical 3 Layer of the router 41 performs communication with Physical 3 Layer of the PGCC 310.

Figure 5:
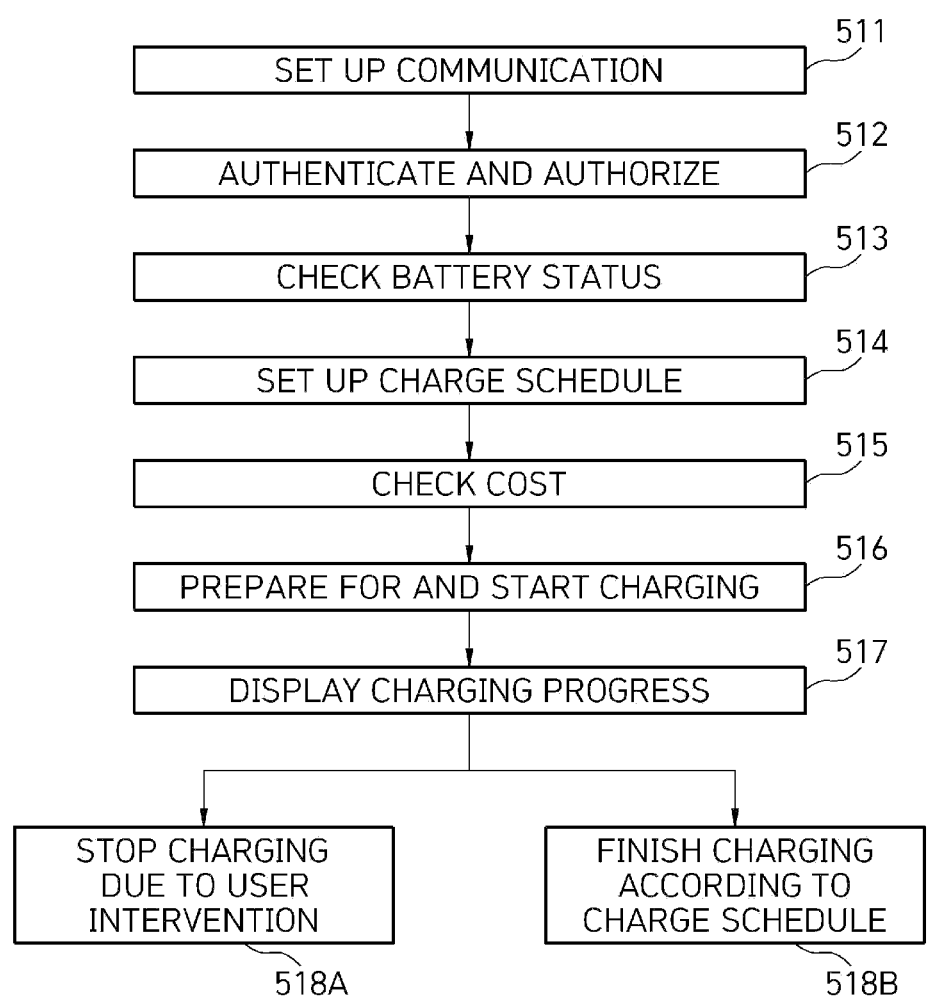
FIG. 5 is a flowchart illustrating a charge scenario according to an embodiment of the present invention.

FIG. 5 is a flowchart illustrating a charge scenario according to an embodiment of the present invention.

Referring to FIG. 5, first, in operation 511, communication setup is performed between the EVCC 150 and the SECC 230.

The communication setup may include procedures such as IP address assignment, SECC discovery, TCP or TLS connection setup, and V2G communication session setup.

The V2G communication session may be a session for exchanging a V2G message between the EVCC 150 and the SECC 230.

The V2G message may be a message exchanged in the application layer between the EVCC 150 and the SECC 230.

The communication setup may further include a process in which the EVCC 150 and the SECC 230 exchange information on a communication protocol version.

Subsequently, in operation 512, when the communication setup is completed, identification, authentication, and authorization processes are performed between the EVCC 150 and the SECC 230.

The EVSE 200 performs authentication processing to check whether the EV 100 is subject to charging or discharging. For example, the SECC 230 and the EVCC 150 exchange their IDs. The SECC 230 may deliver an ID (contract ID) of an EVCC associated with its own ID (EVSE ID) to the power grid operation server 300.

The authorization processing is started by the EVCC 150.

When the SECC 230 delivers the ID of the EVCC 150 associated with its own ID (EVSE ID) to the power grid operation server 300, the power grid operation server 300 may participate in the authentication and authorization processing for the EV 100. Here, the ID of the EVCC 150 may be unique identification code, a contact ID, a vehicle ID, or a vehicle user ID of the EVCC 150.

Subsequently, in operation 513, when the authentication and authorization processing is successfully completed, a process of checking the battery status of the EV 100 is performed.

The check of the battery status is a necessary procedure for setting up a charge schedule. Information for the charge schedule setup may include, for example, the capacity of a battery (Bat_kWh), the voltage of a battery (Bat_voltage), the current SOC value of a battery (Bat_SOC), and the like.

Subsequently, in operation 514, after checking the battery status, a process of setting up a charge schedule is performed.

The charge schedule setup may be a target setting associated with charging. The target setting related to the charging may be to set a time related to a charge process, the amount of energy charge, a charging method, etc, The charging method setting may be to select a quick charging method and/or the cheapest charging method.

Subsequently, in operation 515, when the charge schedule setup is completed, a charging-related cost check process is performed. The cost check process may be a process of exchanging messages related to identification, authentication, and authorization performed between the EV, the EVSE, and the power grid operation server.

The charging-related cost is a cost that a vehicle user has to pay to the EVSE through the payment unit 240 of the EVSE 200.

Subsequently, in operation 516, when the charge cost check is successfully completed, the EV 100 informs the EVSE 200 that it is ready for charging, or conversely, the EVSE 200 informs the EV 100 that it is ready for charging. When the EV 100 and the EVSE 200 receive messages related to being ready for charging (Char_ready, Offchar_ready) from each other, the charging is started.

Subsequently, in operation 517, when the charging preparation process is successfully completed, discharging is started in which discharge energy is transferred from the OBC 120 of the EV 100 to the off-board charger 210 in the EVSE 200, and a process in which the HMI 320 of the power grid operation server 300 displays the discharging progress is performed.

Subsequently, a charge stop process is performed by user intervention while charging is in progress in operation 518A, or a normal charge finish process is performed by a charge schedule in operation 518B.

The charge stop may be a process of forcibly stopping a discharge process by the vehicle user, the operator of the EVSE 200, or the operator of the power grid operation server 300 while charging is in progress.

The charge stop may be performed by the HMIs 140, 220, and 320 installed at the EV 100, the EVSE 200, and the power grid operation server 300, respectively.

The charge finish is to normally finish charging at a charge finish time reserved according to a charge schedule.

Figure 6:
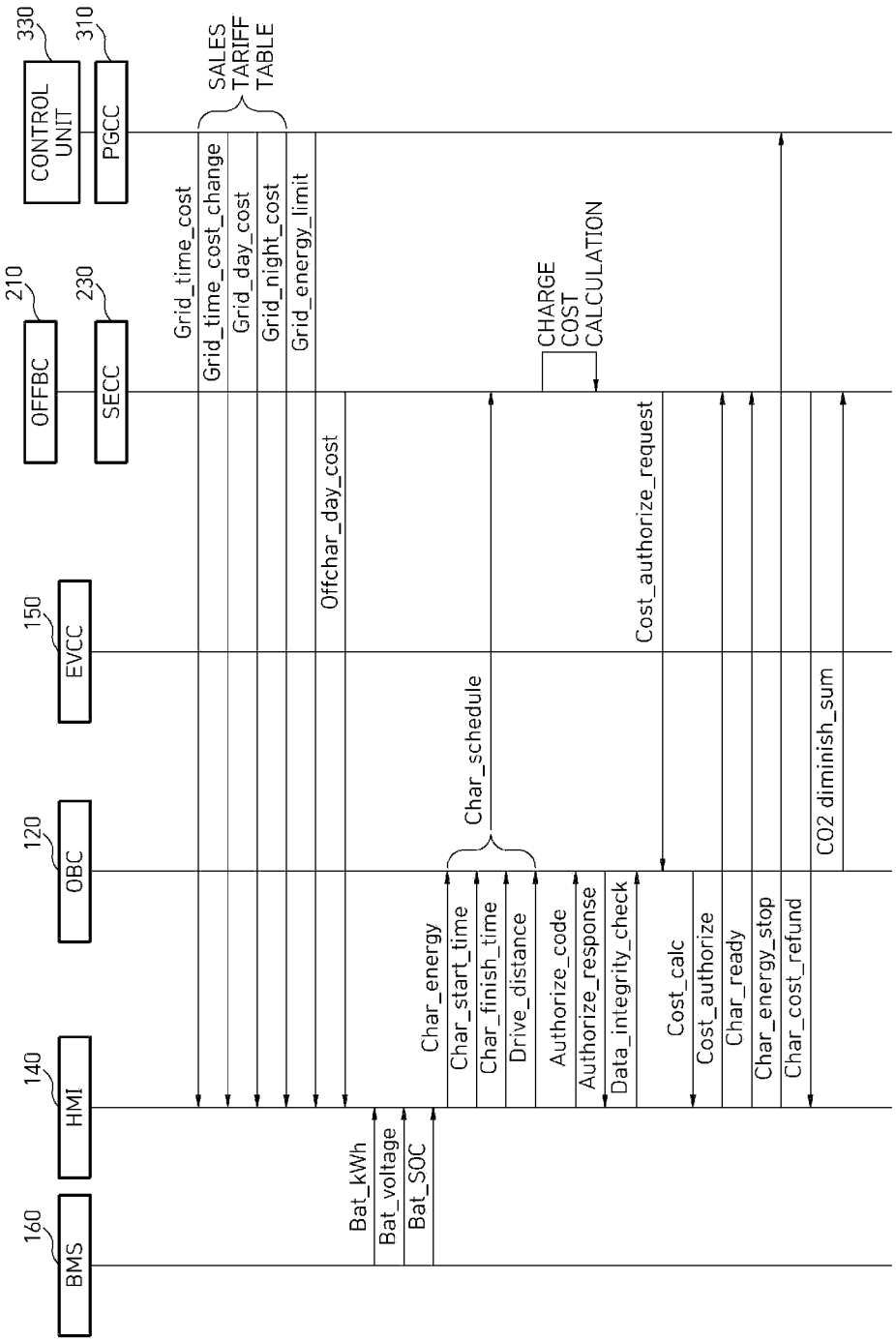
FIG. 6 is a sequence diagram of messages exchanged between an electric vehicle, a supply equipment, and a power grid operation server on the basis of a charge scenario according to an embodiment of the present invention and also is a sequence diagram in the case of setting up a charge schedule in the electric vehicle.

FIG. 6 is a sequence diagram of messages exchanged between an electric vehicle, a supply equipment, and a power grid operation server on the basis of a charge scenario according to an embodiment of the present invention and also is a sequence diagram in the case of setting up a charge schedule in the electric vehicle.

When communication setup between the EVCC 150, the SECC 230, and the PGCC 310 is completed, the entities 120, 140, 150, 210, 230, and 300 exchange messages as shown in FIG. 6.

The term "message" shown in FIG. 6 may be replaced with any one term among "data," "signal," "information," "code," and "command." As shown in FIGS. 2 to 4, the messages may be messages exchanged in the application layer, but the present invention is not limited thereto. That is, the messages shown in FIG. 6 may be defined as messages exchanged in other layers.

Although the messages shown in FIG. 6 are arranged in a vertical direction, this arrangement need not be construed as an arrangement for indicating the transmission order of messages transmitted from one entity to another. Therefore, Message A may be transmitted after Message B is transmitted first although Message A appears above Message B in FIG. 6.

Although not particularly limited, each message shown in FIG. 6 may have a message structure composed of a header and a payload. Information for payload processing may be recorded in the header. For example, a protocol version, a payload type, and a payload length (or a message length) may be recorded in the header. Application data (e.g., each message shown in FIG. 6) may be recorded in the payload. Each message recorded in the payload may be expressed using multiple bit arrays or a flag value of "0" or "1."

Each message shown in FIG. 6 will be described in detail below.

The power grid operation server 300 transmits messages related to the sales tariff table to an EV 100. The messages related to the sales tariff table include Grid_time_cost, Gen_time_cost_change, Grid_day_cost, Grid_night_cost, etc.

The message Grid_time_cost may indicate or include information related to a charge cost for each time according to a local grid situation or a grid schedule.

The charge cost is a cost that an EV (a vehicle user) has to pay to the EVSE 200 or the power grid operation server 300 in order to perform a charge process in which energy is transferred from the off-board charger 210 of the EVSE 200 to the OBC 120 of the EV 100 or a charge process in which energy is transferred from the power grid 400 to the OBC 120 of the EV 100 via the off-board charger 210.

The message Grid_time_cost is transmitted from the power grid operation server 300 to the EV 100 via the PGCC 310, the SECC 230, and the EVCC 150.

A gateway and/or a router may be additionally present between the SECC 230 and the PGCC 310 in a communication path of the message Grid_time_cost.

Hereinafter, unless otherwise specified, it is assumed that a gateway and/or a router are additionally present in a communication path between the SECC 230 and the PGCC 310.

The OBC 120 delivers the message Grid_time_cost received through the EVCC 150 to the HMI 140, and the HMI 140 displays and provides the message Grid_time_cost to the vehicle user.

The message Grid_time_cost is utilized to set up (or create) a charge schedule. For example, the vehicle user may check the message Grid_time_cost to set an optimal charge time (charge reservation time). Here, the optimal charge time refers to a time when the EV 100 may perform a charge process with the lowest charge cost.

The charge time includes a charge start time (Char_start_time) and a charge finish time (Char_finish_time) to be described below.

The message Gen_time_cost_change may indicate or include information related to a variation of a charge cost for each time according to the local grid situation or grid schedule.

The message Grid_time_cost_change is transmitted from the power grid operation server 300 to the EV 100 via the PGCC 310, the SECC 230, and the EVCC 150. The message Gen_time_cost_change is utilized to set up a charge schedule.

The message Grid_day_cost may indicate or include information related to a discharge cost during day time everyday on the basis of the local grid situation or grid schedule.

The message Grid_day_cost is transmitted from the power grid operation server 300 to the EV 100 via the PGCC 310, the SECC 230, and the EVCC 150.

The message Grid_day_cost is utilized, for example, to set up a charge schedule related to an optimal charge time.

The message Grid_night_cost may indicate or include information related to a charge cost during night time everyday on the basis of the local grid situation or the grid schedule.

The message Grid_night_cost is transmitted from the power grid operation server 300 to the EV 100 via the PGCC 310, the SECC 230, and the EVCC 150.

The message Grid_night_cost is utilized, for example, to set up (or create) a charge schedule Char_schedule related to the setting of an optimal charge time.

The power grid operation server 300 may provide the messages Gen_time_cost, Gen_time_cost_change, Grid_day_cost, and Grid_night_cost to the electric vehicle 100 individually or may consolidate the messages Gen_time_cost, Gen_time_cost_change, Grid_day_cost, and Grid_night_cost into a sales tariff table and then provide the sales tariff table to the EV 100.

The message Grid_energy_limit may indicate or include a limit value when it is necessary for the power grid 400 to limit the amount of energy discharge according to the local grid situation.

The message Grid_energy_limit is transmitted from the power grid operation server 300 to the EV 100 via the PGCC 310, the SECC 230, and the EVCC 150.

The message Offgen_day_cost may indicate or include information related to a charge cost that is set differently for each off-board charger.

The message Offgen_day_cost is transmitted from the off-board charger 210 to the EV 100 via SECC 230 and the EVCC 150.

FIG. 1 shows one off-board charger 210, but when multiple off-board chargers are present in the EVSE 200, each off-board charger has a different charge cost from the other off-board chargers.

By each off-board charger delivering the message Offgen_day_cost to the EV 100, a vehicle user of the EV 100 may check a charge cost for each off-board charge, select an appropriate off-board charger, and proceed with a charge process.

The message Offchar_day_cost is utilized to set up (or create) a charge schedule Char_schedule.

The OBC 120 delivers the messages Gen_time_cost, Gen_time_cost_change, Grid_day_cost, Grid_night_cost, and Offgen_day_cost to the HMI 140, and the HMI 140 displays the messages Gen_time_cost, Gen_time_cost_change, Grid_day_cost, Grid_night_cost, and Offgen_day_cost so that the vehicle user can check the messages.

After checking the messages Gen_time_cost, Gen_time_cost_change, Grid_day_cost, Grid_night_cost, and Offgen_day_cost displayed through the HMI 140, the vehicle user sets up an appropriate charge schedule Char_schedule. For example, the vehicle user sets an optimal charge start time, an optimal charge finish time, etc.

The messages Bat_kWh, Bat_voltage, and Bat_SOC are delivered from the BMS 160 to the HMI 140, and the HMI 140 displays and provides the messages Bat_kWh, Bat_voltage, and Bat_SOC to the vehicle user to set up the charge schedule.

Also, the messages Bat_kWh, Bat_voltage, and Bat_SOC are delivered from the BMS 160 to the OBC 120.

The message Bat_kWh may indicate or include information related to the current battery capacity (current battery capacity information) of the vehicle battery 110.

The OBC 120 calculates a charge time on the basis of the battery capacity information. The charge time may be a charge start time and a charge finish time. Alternatively, the charge time may be a time taken to reach the amount of energy charge Char_energy that is set by the vehicle user. The charge time is utilized to set up (or create) a charge schedule Char_schedule.

The message Bat_voltage may indicate or include battery voltage information. The OBC 120 determines whether the battery voltage is abnormal using the battery voltage information, and then calculates the charge time.

The OBC 120 determines whether the battery voltage is abnormal at high temperature in summer using the battery voltage information, and the determination result is utilized to calculate the charge time (the charge start time and the charge finish time).

The OBC 120 determines whether the battery voltage is abnormal at low temperature in winter using the battery voltage information, and the determination result is utilized to calculate the charge time (the charge start time and the charge finish time).

The message Bat_SOC may indicate or include information related to the current state of charge of the vehicle battery.

The OBC 120 utilizes the information related to the current state of charge to calculate the charge time (the charge start time and the charge finish time).

The state of charge (SOC) is utilized as a criterion for determining whether the vehicle battery can be currently discharged. For example, the OBC 120 determines whether the current SOC value falls within a preset chargeable SOC range.

When the current SOC value falls within the chargeable SOC range that is set differently for each season, the charge process is started. Otherwise, the charge process is not started.

For example, the OBC 120 checks the current SOC value to determine the current SOC value falls within chargeable SOC ranges that are set in spring and autumn. Also, the OBC 120 checks the current SOC value and determines whether the current SOC value falls within chargeable SOC ranges that are set in summer and winter The message Char_energy may indicate or include the amount of energy charge that the OBC 120 intends to transfer to the off-board charger.

The vehicle user sets the amount of energy charge through the HMI 140. For example, the vehicle user sets the amount of energy charge in comprehensive consideration of the sales tariff table provided from the power grid operation server 300, the message Offchar_day_cost provided from the off-board charger, and the messages Bat_kWh, Bat_voltage, and Bat_SOC provided from the BMS 160.

The message Char_start_time may indicate or include a charge start time.

The message Char_start_time is transmitted to the EVSE 200 or the off-board charger 210 via the EVCC150 and the SECC 230.

The message Char_start_time is transmitted to the power grid operation server 300 via the EVCC 150, the SECC 230, and the PGCC 310.

The vehicle user sets a charge start time through the HMI 140. Similar to the setting of the amount of energy charge, the vehicle user checks the sales tariff table provided from the power grid operation server 300, the message Offchar_day_cost provided from the off-board charger, and the messages Bat_kWh, Bat_voltage, and Bat_SOC provided from the BMS and then sets the charge start time using an input function of the HMI 140.

For example, after checking the messages Gen_time_cost, Gen_time_cost_change, Grid_day_cost, Grid_night_cost, and Offgen_day_cost through the HMI 140, the vehicle user sets and reserves a charge start time with the lowest charge cost to be paid.

In an example, the vehicle user checks a charge cost (a fee for charging) for each day time and for each night time through the HMI 140 and then sets and reserves a charge start time with the lowest charge cost.

In another example, the vehicle user checks a charge cost that varies daily or hourly and sets and reserves a charge start time with the lowest charge cost.

The message Char_finish_time may indicate or include a charge finish time.

The message Char_finish_time is transmitted to the off-board charger 210 via the EVCC 150 and the SECC 230.

The message Char_finish_time is transmitted to the control unit 330 of the power grid operation server 300 via the EVCC 150, the SECC 230, and PGCC 310.

The vehicle user checks, through the HMI 140, the messages Bat_kWh, Bat_voltage, and Bat_SOC and the messages Grid_time_cost, Grid_time_cost_change, Grid_day_cost, Grid_night_cost, and Offchar_day_cost received from the off-board charger 210 and/or the power grid operation server 300 and then sets and reserves, through the HMI 140, an optimal charge finish time with the lowest charge cost to be paid.

The message Drive_distance may indicate or include information related to the mileage of an EV. Here, the mileage is a distance that the vehicle user intends to travel using the EV.

When the vehicle user inputs the mileage (or traveled distance) of the EV 100 to the HMI 140, the HMI 140 delivers the mileage to the OBC 120, and the OBC 120 sets up a charge schedule on the basis of the mileage input through the HMI 140. The OBC 120 automatically calculates the amount of energy charge on the basis of the mileage input from the HMI 140.

For example, when the maximum mileage that the electric vehicle 100 can travel with the current battery capacity of the vehicle battery is smaller than the mileage input by the vehicle user through the HMI 140, the OBC 120 calculates the amount of energy charge corresponding to the difference between the maximum mileage that the EV 100 can travel with the current battery capacity and the mileage input by the vehicle user through the HMI 140.

On the contrary, when the maximum mileage that the EV 100 can travel with the current battery capacity is greater than or equal to the mileage input by the vehicle user, the OBC 120 does not calculate the amount of energy charge.

The OBC 120 transfers the amount of energy charge calculated based on the mileage input by the vehicle user to the HMI 140, and the HMI 140 displays the calculated amount of energy charge so that the vehicle user can check the amount of energy charge.

The message Drive_distance is transmitted from the EVCC 150 of the EV 100 to the SECC 230 of the EVSE 200 or is transmitted to the PGCC 310 of the power grid operation server 300 via the SECC 230 of the EVSE 200.

The message Char_schedule may indicate or include charge schedule-related information including the messages Char_energy, Char_start_time, Char_finish_time, and Drive_distance.

The message Char_schedule is transmitted from the EVCC 150 of the EV 100 to the SECC 230 of the EVSE 200 or is transmitted to the PGCC 310 of the power grid operation server 300 via the SECC 230 of the EVSE 200.

The messages Char_energy, Char_start_time, Char_finish_time, and Drive_distance may be individually transmitted to the SECC 230 of the EVSE 200 or the PGCC 310 of the power grid operation server 300 or may be consolidated into the message Char_schedule and transmitted to the SECC 230 of the EVSE 200 or the PGCC 310 of the power grid operation server 300.

Authorize_code: The message Authorize_code may indicate or include authorization code of a vehicle user.

The message Authorize_code is delivered from the HMI 140 to the OBC 120.

The authorization code, which is special code assigned to each vehicle, is personal information used for cost settlement.

The message Authorize_response is a message transmitted from the OBC 120 to the HMI 140 and is a response message to the message Authorize_code.

The message Data_integrity_check, which is a message transmitted from the HMI 140 to the OBC 120, is utilized to check identification code for a data integrity check.

The message Cost_authorize_request, which is a message requesting authorization for a charge cost, is transmitted from the EVSE 200 to the EV 100.

The message Cost_authorize_request may be configured to include information related to the charge cost calculated by the EVSE 200.

The charge cost is a calculated charge cost Cost_calc that the vehicle user has to pay through the payment unit 240 of the EVSE 200 when charging the EV 100.

The charge cost may be calculated by the off-board charger 210 of the EVSE 200. For example, the off-board charger 210 receives a charge schedule Char_schedule from the EV 100 through the SECC 230 and calculates a charge cost on the basis of the received charge schedule.

When the charge schedule Char_schedule is transmitted from the EV 100 to the power grid operation server 300 via a supply equipment, the calculation of the charge cost may also be performed by the power grid operation server 300. In this case, the power grid operation server may transmit the message Cost_authorize_request to the EVSE 200 and/or the EV 100.

When the EV 100 receives the message Cost_authorize_request, the charge cost Cost_calc included in the message Cost_authorize_request is delivered to the HMI 140, and the HMI 140 displays the charge cost Cost_calc so that the vehicle user can check the charge cost. The vehicle user checks information on the charge cost displayed from the HMI 140 and determines whether to authorize the charge cost.

The determination of whether to authorize the charge cost may also be performed in the power grid operation server 300. In this case, the EVSE 200 transmits the message power Cost_authorize_request to the power grid operation server 300, and an operator of the power grid operation server 300 checks a charge cost through the HMI 320 and determines whether to authorize the charge cost.

The message Cost_authorize is a response to the message Cost_authorize_request and is a message indicating authorization for the charge cost calculated by the off-board charger 210.

Although FIG. 6 shows an example in which the message Cost_authorize is transmitted from the EV 100 to the EVSE 200, the message Cost_authorize may be transmitted to the power grid operation server 300 via the EVSE 200.

After receiving the authorization message Cost_authorize, the off-board charger 210 displays the authorization message Cost_authorize through the HMI 220 so that an administrator (an electric provider or an operator) of the off-board charger 210 can check the authorization message Cost_authorize.

When checking the authorization message Cost_authorize displayed from the HMI 220, the administrator of the off-board charger 210 starts preparing for charging.

The message Char_ready is a message indicating that it is ready for charging and is a message that the OBC 120 and the off-board charger 210 exchange with each other through respective communication controllers.

When the exchange of the message Char_ready is completed, the OBC 120 and the off-board charger 210 start charging according to a charge schedule Gen_schedule set in the EV.

The message Car_energy_stop is a message transmitted from the EV 100 to the EVSE 200 or to the power grid operation server 300 via the EVSE 200 in order for the vehicle user to forcibly stop charging while the charging of the EV 100 is in progress.

When the vehicle user inputs a command to forcibly stop the charge process through the HMI 140, the HMI 140 delivers the message Car_energy_stop corresponding to the command to the OBC 120, and the OBC 120 transmits the message Car_energy_stop to the SECC 230 through EVCC 150.

The SECC 230 delivers the message Car_energy_stop received from the EVCC 150 to the off-board charger 210, and the off-board charger 210 stops the charge process in response to the message Car_energy_stop.

Also, the SECC 230 transmits the message Car_energy_stop received from the EVCC 150 to the PGCC 310 of the power grid operation server 300 to inform the power grid operation server 300 that the charge process is stopped.

When receiving the message Car_energy_stop, the EVSE 200 and/or the power grid operation server 300 ignore the charge finish time determined according to the charge schedule and immediately stop the charge process.

Meanwhile, when the vehicle user needs to immediately stop charging the EV 100, the vehicle user may stop the charge process using a charge stop button displayed by the HMI 140 or a physical button installed in the EV 100.

The message Char_cost_refund may indicate or include information related to a return cost deducted from the charge cost paid by the vehicle user to the payment unit 240 of the EVSE 200 when the charge process is forcibly stopped by the message Car_energy_stop.

The return cost is a difference cost between the charge cost calculated according to the amount of energy charge set by the vehicle user and the cost calculated according to the amount of energy charged up to when the charge process is forcibly stopped.

The return cost is calculated by the EVSE 200. For example, the return cost may be calculated by the off-board charger 210 of the EVSE 200.

Alternatively, the calculation of the return cost may also be performed by the power grid operation server 300. For example, the return cost may be calculated by the control unit 330 of the power grid operation server 300.

The message CO2 diminish_sum indicates or includes information related to the amount of carbon dioxide ($CO_2$) reduction calculated based on the amount of energy consumption of the EV 100 or a value obtained by accumulating the amount of $CO_2$ reduction and is transmitted from the OBC 120 of the EV 100 to the power grid operation server 300 or the off-board charger 210 of the EVSE 200.

The OBC 120 periodically collects the amount of energy consumption of the EV 100 and calculates the amount of $CO_2$ reduction on the basis of the collected amount of energy consumption.

The amount of $CO_2$ reduction may be calculated by a conversion table or a conversion expression that represents a mapping relationship between the amount of energy consumption and the amount of $CO_2$ reduction. The conversion table or the conversion expression may be provided from the EVSE 200 or the power grid operation server 300.

The amount of energy consumption, which is the consumption amount of electric energy charged in the vehicle battery 110, may be calculated based on mileage and speed and may be provided from, for example, the BMS 160. It will be appreciated that the OBC 120 may calculate the amount of energy consumption on the basis of battery information provided from the BMS 160. The amount of energy consumption may be, for example, an SOC value, the amount of power consumption, etc.

Also, the amount of energy consumption may include at least one of the amount of energy charge and the amount of energy discharge.

The calculation of the amount of $CO_2$ reduction according to the amount of energy consumption may be performed by the BMS 160. In this case, the BMS 160 provides the calculated amount of $CO_2$ reduction to the OBC 120.

The OBC 120 may deliver the amount of $CO_2$ reduction to the HMI 140, and the HMI 140 may display and provide the amount of $CO_2$ reduction to the vehicle user.

The amount of $CO_2$ reduction is utilized to provide credit or incentive to vehicle users who participate in $CO_2$ emission regulation. For example, the amount of $CO_2$ reduction may be utilized to calculate a cost deducted from a charge cost that a vehicle user has to pay to the payment unit 240 of the EVSE 200 when charging an EV.

The incentive cost or deduction cost may be calculated by the EVSE 200 or the power grid operation server 300. For example, the off-board charger 210 may calculate the incentive cost or the deduction cost on the basis of the amount of $CO_2$ reduction received through the SECC 230.

The calculated incentive cost or deduction cost may be transmitted to the EV 100 and displayed through the HMI 140 in the EV 100, and the vehicle user may check the incentive cost or the deduction cost displayed through the HMI 140.

When the calculation of the incentive cost or the deduction cost is incorrect, the EV 100 may transmit a message re-requesting the cost calculation to the EVSE 200 or the power grid operation server 300.

After checking the incentive cost or the deduction cost displayed through the HMI 140, the vehicle user may determine whether to authorize the cost. Although not shown in FIG. 6, the EV 100 may transmit a message indicating a result of the authorization for the incentive cost or the deduction cost to the EVSE 200 or the power grid operation server 300.

The calculation of the incentive cost or the deduction cost may be performed by the EV 100. For example, the OBC 120 or the electronic control unit 130 of the EV 100 may calculate the incentive cost or the deduction cost for the amount of $CO_2$ reduction. In this case, the authorization for the incentive cost or the deduction cost is performed by the EVSE 200 or the power grid operation server 300, and an authorization message is transmitted from the EVSE 200 or the power grid operation server 300 to an EV.

Figure 7:
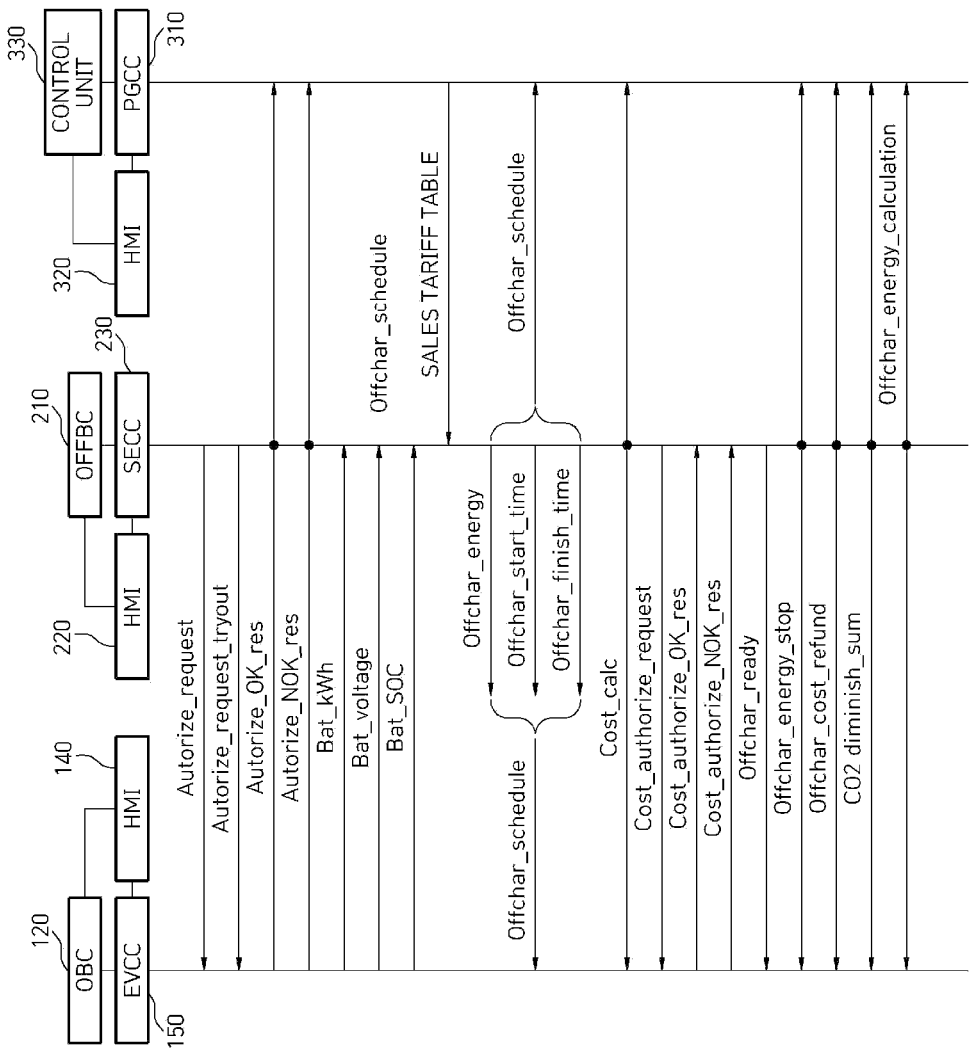
FIG. 7 is a sequence diagram of an electric vehicle, a supply equipment, and a power grid operation server according to another embodiment of the present invention and also is a sequence diagram in the case of setting up a charge schedule in the supply equipment.

FIG. 7 is a sequence diagram between an electric vehicle, a supply equipment, and a power grid operation server according to another embodiment of the present invention and also is a sequence diagram in the case of setting up a charge schedule in the supply equipment.

When communication setup between entities 120, 140, 150, 210, 230, and 300 is completed, the entities 120, 140, 150, 210, 230, and 300 exchange messages as shown in FIG. 7.

The term "message" shown in FIG. 7 may be replaced with any one term among "data," "signal," "information," "code," and "command." As shown in FIGS. 2 to 4, the messages may be messages exchanged in the application layer. However, the present invention is not limited thereto, and the messages may be messaged exchanged in other layers.

Although the messages shown in FIG. 7 are arranged in a vertical direction, this arrangement need not be construed as an arrangement for indicating the transmission order of messages. Therefore, depending on the design, Message A may be transmitted after Message B is transmitted first although Message A appears above Message B.

Similar to the message structure described with reference to FIG. 6, the message structure of FIG. 7 may be composed of a header and a payload. The description of the message structure shown in FIG. 7 is replaced with the description of the message structure described with reference to FIG. 6.

Each message shown in FIG. 7 will be described in detail below.

The message Authorize_request may indicate or include information related to an authentication authorization request. The information related to the authentication authorization request may be configured to include identification information ID of the off-board charger 210 or identification information EVSE ID of the EVSE 200.

An operator (electric provider) of the EVSE 200 inputs the information related to the authentication authorization request through the HMI 220 of the EVSE 200.

The off-board charger 210 delivers the information related to the authentication authorization request to the SECC 230, and the SECC 230 configures the information related to the authentication authorization request into the message Authorize_request according to a communication protocol agreed with the EVCC 150 and transmits the message Authorize_request to the EVCC 150.

The EVCC 150 delivers the message Authorize_request received from the SECC 230 to the OBC 120 of the EV 100, and the OBC 120 delivers the message Authorize_request to the HMI 140 in the EV 100.

The HMI 140 displays the message Authorize_request delivered from the OBC 120 so that the vehicle user can check the message Authorize_request.

The message Authorize_request_tryout is a message re-requesting authentication authorization from the EV 100.

The message Authorize_OK_res is a response message to the message Authorize_request and is a message allowing the authentication authorization requested by the EVSE 200 or the off-board charger 210 of the EVSE 200.

The off-board charger 210 starts the charge process when receiving the message Authorize_OK_res from the EV 100.

The message Authorize_NOK_res is a response message to the message Authorize_request and is a message disallowing the authentication authorization request of the off-board charger 210 in case of authentication failure.

When receiving the message Authorize_NOK_res from the EV 100, the EVSE 200 terminates the authorization process or transmits the message Authorize_request_tryout to the EV to re-request authentication authorization.

The messages Bat_kWh, Bat_voltage, and Bat_SOC are the same as the messages Bat_kWh, Bat_voltage, and Bat_SOC described with reference to FIG. 6.

The messages Bat_kWh, Bat_voltage, and Bat_SOC are utilized for charge schedule setup performed in the EVSE 200 and are displayed through the HMI 220 of the EVSE 200.

An operator (or an electric provider) of the EVSE 200 sets up a charge schedule on the basis of the messages Bat_kWh, Bat_voltage, Bat_SOC displayed from the HMI 220.

The setup of the charge schedule performed by the EVSE 200 may also be performed by the vehicle user rather than the operator (or the electric provider) of the EVSE 200. For example, after moving to the EVSE 200, the vehicle user may set up the charge schedule by inputting charge schedule-related information to the HMI 220 of the EVSE 200.

The message Offchar_energy, which is a message indicating or including the amount of energy charge of the off-board charger 210, is transmitted from the EVSE 200 to the EV 100.

The vehicle user or the operator (electric provider) of the EVSE 200 sets the amount of energy charge on the basis of the sales tariff table displayed from the HMI 220 and/or the messages Bat_kWh, Bat_voltage, and Bat_SOC provided from the EV 100, and inputs the amount of energy charge to the HMI 220.

The sales tariff table includes the messages Grid_time_cost, Grid_time_cost_change, Grid_day_cost, and Grid_night_cost described with reference to FIG. 6 and is provided from the power grid operation server 300.

The HMI 220 delivers the amount of energy charge to the off-board charger 210, and the off-board charger 210 transmits the amount of energy charge transferred from the HMI 220 to the EV 100 through the SECC 230.

The amount of energy charge may be one of the pieces of information constituting the charge schedule. The operator of the EVSE 200 or the vehicle user of the EV 100 sets the most advantageous amount of energy charge on the basis of the sales tariff table.

The setting of the amount of energy charge may also be performed by the power grid operation server 300. In this case, the power grid operation server 300 may receive messages or information necessary to set the amount of energy charge from the EVSE 200 or from the EV 100 via the EVSE 200.

The message Offchar_start_time indicates or includes a charge start time of the off-board charger 210 and is transmitted from the EVSE 200 to the EV 100. The message Offgen_start_time may be one of the pieces of information constituting the charge schedule.

The operator of the EVSE 200 may reserve and set the charge start time of the off-board charger 210 using the HMI 220. At this time, the operator of the EVSE 200 may reserve and set an optimal charge start time on the basis of the sales tariff table provided from the power grid operation server 300 and the messages Bat_kWh, Bat_voltage, and Bat_SOC received through the SECC 230. Here, the optimal charge start time may be a time at which the vehicle user or the operator of the EVSE 200 can perform a charge process with the lowest charge cost.

The setting of the charge start time may also be performed not by the operator of the EVSE 200 but by the vehicle user. For example, after moving to the EVSE 200, the vehicle user may set the optimal charge start time using the HMI 220 of the EVSE 200.

The setting of the charge start time may also be performed by the power grid operation server 300. In this case, the power grid operation server 300 may receive messages or information necessary to set the charge start time from the EVSE 200 or from the EV 100 via the EVSE 200.

The message Offgen_finish_time indicates or includes a charge finish time of the off-board charger 210 and is transmitted from the EVSE 200 to the EV 100. The charge finish time may be one of the pieces of information constituting the charge schedule.

To set the charge finish time, the operator of the EVSE 200 may reserve and set the charge finish time of the off-board charger 210 using the HMI 220. At this time, the operator of the EVSE 200 may reserve and set the charge finish time on the basis of the sales tariff table provided in advance from the power grid operation server 300 and the messages Bat_kWh, Bat_voltage, and Bat_SOC provided from the EV 100.

The setting of the charge finish time may be performed not by the operator of the EVSE 200 but by the vehicle user. For example, after moving to the EVSE 200, the vehicle user may set the charge finish time using the HMI 220 of the EVSE 200.

The setting of the charge finish time may also be performed by the power grid operation server 300. In this case, the power grid operation server 300 may receive messages or information necessary to set the charge finish time from the EVSE 200 or from the EV 100 via the EVSE 200.

The off-board charger 210 configures a charge schedule Offchar_schedule based on the messages Offchar_energy, Offchar_start_time, and Offchar_finish_time input through the HMI 220.

The off-board charger 210 transmits the charge schedule Offchar_schedule to the EV 100 through the SECC 230. FIG. 7 illustrates an example in which the off-board charger 210 transmits the charge schedule Offchar_schedule to the EV, but the off-board charger 210 may also transmit the charge schedule Offchar_schedule to the power grid operation server 300.

The HMI 140 of the EV 100 displays the charge schedule Offchar_schedule received from the EVSE 200 so that the vehicle user can check the charge schedule Offchar_schedule.

The HMI 320 of the power grid operation server 300 displays the charge schedule Offchar_schedule received from the EVSE 200 so that the operator of the power grid operation server 300 can check the charge schedule Offchar_schedule.

The message Cost_calc indicates or includes a charge cost calculated by the EVSE 200 and is transmitted to the EV 100 and the power grid operation server 300.

The charge cost, which is a cost that the vehicle user has to pay to the EVSE 200, is calculated based on the charge schedule set by the EVSE 200. For example, the charge cost is calculated based on the amount of energy charge, the charge start time, and the charge finish time.

The charge cost is calculated by the EVSE 200. For example, the charge cost may be calculated by the off-board charger 210 of the EVSE 200 or another control unit connected to the off-board charger 210 of the EVSE 200.

Alternatively, the charge cost may also be calculated by the power grid operation server 300. In this case, the power grid operation server 300 may receive a charge schedule from the EVSE 200 and may perform a charge cost calculation based on the received charge schedule.

When the power grid operation server 300 performs the charge cost calculation, the power grid operation server 300 may transmit the charge cost to the EVSE 200 and/or to the EV 100 via the EVSE 200.

The message Cost_authorize_request, which is a message requesting authorization for a calculated charge cost, is transmitted from the EVSE 200 to the EV 100.

When the power grid operation server 300 calculates a charge cost, the message Cost_authorize_request is transmitted to the EVSE 200 or to the EV 100 via the EVSE 200.

The message Cost_Authorize_OK_res is a response message to the message Cost_authorize_request and is an authorization message for a charge cost. The message Cost_Authorize_OK_res is transmitted from the EV 100 to the EVSE 200.

When the EVSE 200 receives the message Cost_Authorize_OK_res, the off-board charger 210 of the EVSE 200 starts a charging process.

The message Cost_Authorize_NOK_res is a response message to the message Cost_authorize_request and is a message disallowing the authorization for the charge cost. When the EVSE 200 receives the message Cost_Authorize_NOK_res, the EVSE 200 re-requests the authorization for the charge cost or finishes the cost authorization procedure.

The message Offchar_ready, which is a message informing the electric vehicle 100 that the EVSE 200 is ready for charging, is transmitted from the EVSE 200 to the EV 100.

The OBC 120 of the EV 100 starts charging when the message Offchar_ready is received from the EVSE 200 through the EVCC 150.

When the HMI 140 displays that the off-board charger 210 is ready for charging, the vehicle user commands the OBC 120 to start charging using the HMI 140.

The message Offchar_ready may also be transmitted to the power grid operation server 300 to inform the power grid operation server 300 that the off-board charger 210 is ready for charging.

The message Offchar_energy_stop, which is a message for stopping the charging before the charge finish time included in the charge schedule while charging is in progress according to the charge schedule, is transmitted from the EVSE 200 to the EV 100 and/or the power grid operation server 300.

The charging may be stopped by the HMI 220 of the EVSE 200. For example, the vehicle user or the operator of the EVSE 200 may issue a command to stop charging using the HMI 220 of the EVSE 200.

The charge stop may also be performed by the operator of the power grid operation server 300, and in this case, the power grid operation server 300 transmits the message Offchar_energy_stop to the EVSE 200 and/or the EV 100.

The message Offchar_Cost_refund, which is a cost deducted from the charge cost by forcibly stopping the charge process, may indicate or include information related to a cost returned to the vehicle user (hereinafter referred to as a return cost).

The return cost is a cost calculated by subtracting a charge cost calculated up to when the charging is stopped from a charge cost initially calculated according to the charge schedule.

The message Offgen_Cost_refund is transmitted from the EVSE 200 to the EV 100 and the power grid operation server 300. The HMI 140 of the EV 100 displays the return cost corresponding to the message Offgen_Cost_refund so that the vehicle user can check the return cost. Similarly, the HMI 320 of the power grid operation server 300 displays the return cost corresponding to the message Offgen_Cost_refund so that the operator of the power grid operation server 300 can check the return cost.

Although not shown in FIG. 7, the EVSE 200 and the EV 100 may exchange messages related to the authorization procedure for the return cost. Similarly, the EVSE 200 and the power grid operation server 300 may exchange messages related to the authorization procedure for the return cost.

The message Offgen_CO2_diminish_sum indicates or includes information related to the amount of CO2 reduction calculated based on the amount of energy consumption (the amount of electricity consumption) of the off-board charger 210 or a value of accumulating the amount of CO2 reduction and is transmitted from the EVSE 200 to the EV 100.

The off-board charger 210 periodically collects the amount of energy consumption of the EV 100 or the amount of energy consumption of the off-board charger 210 through the SECC 230 and calculates the amount of CO2 reduction on the basis of the collected amount of energy consumption.

The amount of CO2 reduction may be calculated by a conversion table or a conversion expression that represents a mapping relationship between the amount of energy consumption and the amount of CO2 reduction. The conversion table or the conversion expression may be provided from the power grid operation server 300.

The conversion table or the conversion expression may be included in a sales tariff table provided by the power grid operation server 300.

The amount of energy consumption of the off-board charger 210 may include at least one of the amount of electric energy transferred by the off-board charger 210 to the OBC 120 of the EV 100 (the charging of the EV) and the amount of electric energy supplied by the off-board charger 210 from the power grid 400.

Information related to the amount of CO2 reduction is transmitted to the HMI 140 of the EV 100 and the HMI 320 of the power grid operation server 300, and the vehicle user and the operator of the power grid operation server 300 are informed of the information related to the amount of CO2 reduction.

The amount of CO2 reduction is utilized to calculate credit or an incentive cost for vehicle users or operators of the EVSE 200 who participate in CO2 emission regulation. For example, the amount of CO2 reduction may be used to calculate a cost deducted from the charge cost that the vehicle user has to pay to the EVSE. Also, the amount of CO2 reduction may be used to calculate a cost deducted from a cost that the power grid operation server bills to the EVSE according to the amount of energy consumption of the EVSE.

The message Offgen_energy_calculation indicates or includes information related to the amount of energy consumption of the off-board charger 210 and is delivered to the power grid operation server 300.

The power grid operation server 300 checks the amount of energy consumption of the off-board charger 210 through the message Offgen_energy_calculation, and the message Offgen_energy_calculation is utilized to calculate a cost corresponding to the amount of energy consumption and a cost to be returned from the power grid to the EVSE 200 or the EV 100.

Figure 8:
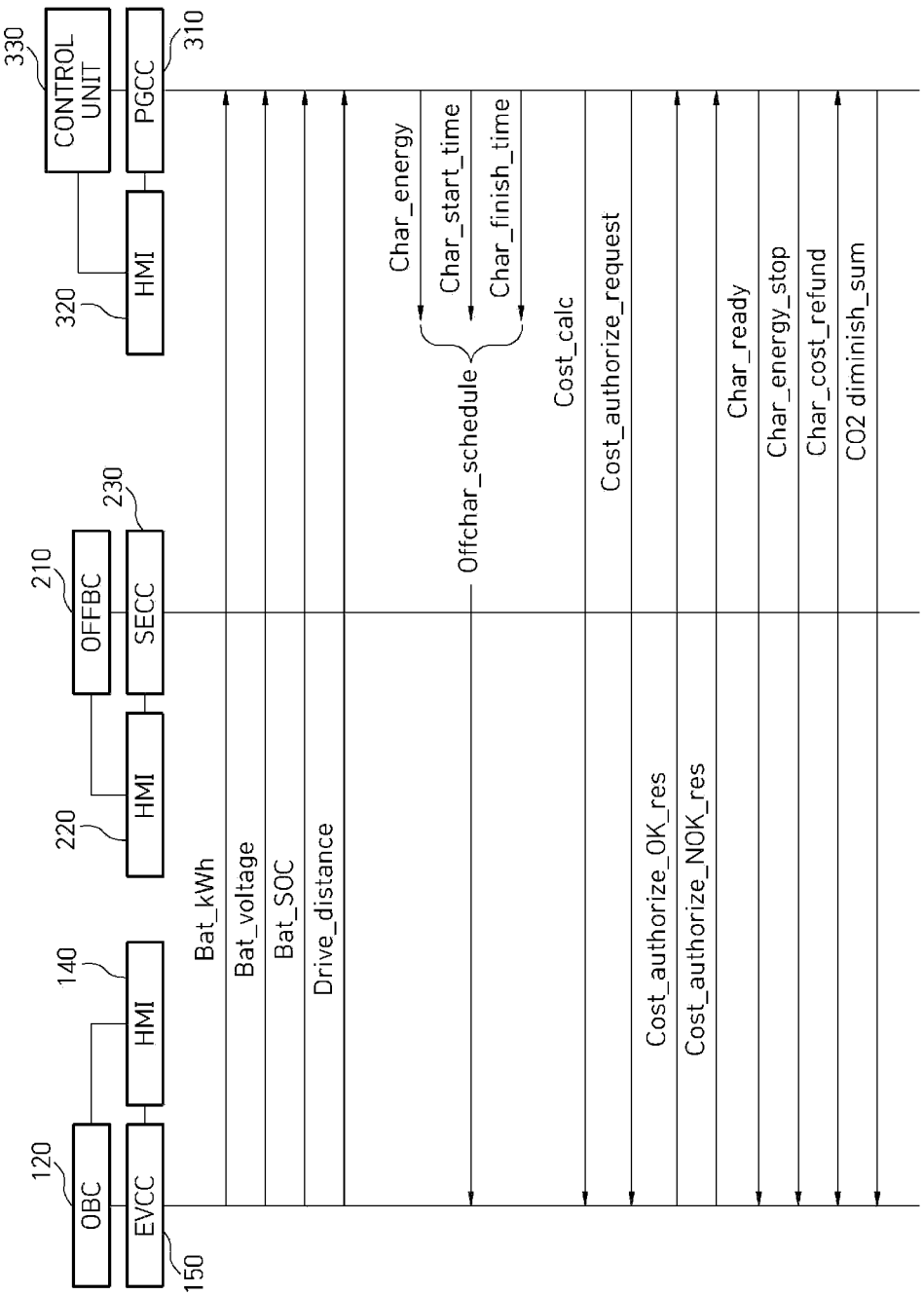
FIG. 8 is a sequence diagram of an electric vehicle, a supply equipment, and a power grid operation server according to still another embodiment of the present invention and also is a sequence diagram in the case of setting up a charge schedule in the power grid operation server.

FIG. 8 is a sequence diagram of an electric vehicle, a supply equipment, and a power grid operation server according to still another embodiment of the present invention and also is a sequence diagram in the case of setting up a charge schedule in the power grid operation server.

The properties of the messages shown in FIG. 8 are the same as those of the messages shown in FIGS. 6 and 7. However, the messages have different origins and destinations. Accordingly, the description of each message replaces the description with reference to FIGS. 6 and 7, and the origin and destination of each message will be briefly described below.

In an embodiment of FIG. 8, the charge schedule is set up by the power grid operation server 300, which manages and monitors the power grid 400. Accordingly, information and/or messages constituting the charge schedule, for example, the amount of energy charge Char_energy, the charge start time Char_start_time, and the charge finish time Char_finish_time are transmitted from the power grid operation server 300 to the EV 100 via the EVSE 200.

The mileage Drive_distance utilized to set the amount of energy charge is transmitted from the EV 100 to the power grid operation server 300 via the EVSE 200.

The battery capacity information Bat_kWh, the battery voltage information Bat_voltage, and the battery status information Bat_SOC which are utilized to set up the charge schedule are transmitted from the EV 100 to the power grid operation server 300 via the EVSE 200.

In an embodiment of FIG. 8, in addition to the charge schedule, the charge cost is calculated by the power grid operation server 300. Accordingly, the charge cost is transmitted from the power grid operation server 300 to the EV 100 via the EVSE 200.

Since the charge cost calculation is performed by the power grid operation server 300, an authorization request message Cost_authorize_request for the charge cost is also transmitted from the power grid operation server 300 to the EV 100 via the EVSE 200.

The response messages Cost_authorize_OK_res and Cost_authorize_NOK_res to the authorization request message Cost_authorize_request are transmitted from the EV 100 to the power grid operation server 300 via the EVSE 200.

In an embodiment of FIG. 8, the forcible stop of the charging is commanded by the power grid operation server 300. Therefore, the message Char_energy_stop commanding the forcible stop of the charge process according to the charge schedule is transmitted from the power grid operation server 300 to the EV 100 via the EVSE 200.

When the power grid 400 is currently overloaded in summer, the power grid operation server 300 may determine to stop charging.

A cost Cahr_cost_refund deducted from a charge cost calculated according to the charge schedule due to the forcible stop of the charge process is transmitted from the power grid operation server 300 to the EV 100 via the EVSE 200.

Information related to the amount of CO2 reduction is transmitted from the power grid operation server 300 to the EV 100 via the EVSE 200.

According to the present invention, by defining charge process-related messages exchanged between an electric vehicle, a supply equipment, and a power grid, it is possible to establish an efficient billing policy for each time, and also it is possible to efficiently operate the power grid. Also, it is possible to provide credit or incentive to a vehicle user and an operator of a supply equipment that participate in CO2 emission regulation.

The scope of the present invention should be defined not by the detailed description but by the appended claims, and all differences falling within a scope equivalent to the claims should be construed as being encompassed by the present invention.

What is claimed is:

1. A method of communicating between an electric vehicle, a supply equipment, and a power grid operation server that monitors a power grid, which allows the electric vehicle to set up a charge schedule and which is performed by an electric vehicle communication controller of the electric vehicle, the method comprising operations of:
   transmitting a message related to the charge schedule including a charge start time and a charge finish time with a lowest charge cost, a mileage input by a vehicle user through a human-machine interface, and an amount of energy charge calculated according to the mileage to a supply equipment communication controller of the supply equipment and to a power grid communication controller of the power grid operation server via the supply equipment communication controller;
   transmitting a message related to an amount of carbon dioxide reduction calculated according to the amount of energy consumption of the electric vehicle to the supply equipment communication controller;
   receiving, from the supply equipment communication controller, a message related to a charge cost calculated according to the charge schedule as a charge cost to be paid to the supply equipment and a cost deducted from the charge cost from the amount of carbon dioxide reduction;
   transmitting an authorization message for the charge cost and the deduction cost to the supply equipment communication controller;
   exchanging a message indicating that the electric vehicle is ready for charging with the supply equipment communication controller in order to start charging the electric vehicle, and
   transmitting, after the charging of the electric vehicle is started, a message commanding the stop of the charging to the supply equipment communication controller and to the power grid communication controller via the supply equipment communication controller in order to stop charging before a charge finish time set by the charge schedule.

2. The method of claim 1, wherein the charge start time and the charge finish time are set based on a sales tariff table provided from the power grid operation server.

3. The method of claim 1, wherein the amount of energy charge is set according to a difference between a maximum mileage that the electric vehicle is capable of traveling with the current battery capacity of a vehicle battery and a mileage that the vehicle user inputs through the human-machine interface.

4. The method of claim 1, further comprising, after the operation of transmitting a message commanding the stop of the charging to the supply equipment communication controller and to the power grid communication controller via the supply equipment communication controller, an operation of receiving a message related to a return cost occurring due to the stop of the charging from the supply equipment communication controller,
   wherein the return cost is a cost obtained by deducting, from the charge cost, a charge cost calculated until the charging is stopped.

5. The method of claim 1, wherein the amount of energy consumption of the electric vehicle includes at least one of the amount of energy charge and the amount of energy discharge.

6. An electric vehicle connected to a power grid via a supply equipment, the electric vehicle comprising:
   a human-machine interface configured to set up a charge schedule;
   an electric vehicle communication controller configured to communicate with a supply equipment communication controller of the supply equipment to exchange a message related to the charge schedule; and
   an on-board charger configured to receive electric energy from an off-board charger of the supply equipment according to the charge schedule,
   wherein the electric vehicle communication controller is configured to:
   transmit, to the supply equipment communication controller, a message related to the charge schedule including a charge start time and a charge finish time with the lowest charge cost, a mileage input through the human-machine interface, and the amount of energy charge, a charge start time, and a charge finish time calculated according to the mileage and a message related to an amount of carbon dioxide reduction calculated according to the amount of energy consumption of the electric vehicle; and
   receive, from the supply equipment communication controller, a message related to a charge cost calculated according to the charge schedule as a charge cost to be paid to the supply equipment and a cost deducted from the charge cost from the amount of carbon dioxide reduction;
   transmit an authorization message for the deduction cost to the supply equipment communication controller; and
   transmit, after the charging of the electric vehicle is started, a message commanding a charge stop to the supply equipment communication controller and to a power grid communication controller of a power grid operation server that monitors the power grid via the supply equipment communication controller.

7. The electric vehicle of claim 6, wherein the amount of energy charge is set according to a difference between a maximum mileage that the electric vehicle is capable of traveling with the current battery capacity of a vehicle battery and a mileage that the vehicle user inputs through the human-machine interface.

8. The electric vehicle of claim 6, wherein
   the electric vehicle communication controller receives a message related to a return cost occurring due to the charge stop from the supply equipment communication controller, and the return cost is a cost obtained by deducting, from the charge cost, a charge cost calculated until the charging is stopped.

9. The electric vehicle of claim 6, wherein the amount of energy consumption of the electric vehicle includes at least one of the amount of energy charge and the amount of energy discharge.

\* \* \* \* \*